United States Patent
Li et al.

(10) Patent No.: US 8,085,172 B2
(45) Date of Patent: Dec. 27, 2011

(54) BUS ENCODING/DECODING METHOD AND BUS ENCODER/DECODER

(75) Inventors: Yu Li, Beijing (CN); Haibo Lin, Beijing (CN); Wen Bo Shen, Beijing (CN); Kai Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 12/360,914

(22) Filed: Jan. 28, 2009

(65) Prior Publication Data

US 2009/0193159 A1    Jul. 30, 2009

(30) Foreign Application Priority Data

Jan. 29, 2008    (CN) .......................... 2008 1 0001500

(51) Int. Cl.
H03M 5/00    (2006.01)
(52) U.S. Cl. ........................................... 341/58; 341/59
(58) Field of Classification Search .................... 341/58, 341/59, 55, 60, 56; 375/295, 244, 253, 288; 710/100, 124, 104; 711/1, 100, 154, 167
See application file for complete search history.

(56) References Cited

U.S. PATENT DOCUMENTS
7,899,961 B2 *    3/2011    Kao .............................. 710/100

OTHER PUBLICATIONS

M. R. Stan and W. P. Burleson, "Bus-Invert Coding for Low-Power I/O", IEEE Transactions on VLSI, vol. 3 issue 1, Mar. 1995, pp. 49-58.

* cited by examiner

Primary Examiner — Joseph Lauture
(74) Attorney, Agent, or Firm — Vazken Alexanian

(57) ABSTRACT

An encoding method and an encoder for encoding data transmitted in a manner of bursts via a parallel bus and a decoding method and a decoder. The encoding method includes organizing data of the bursts into matrixes, determining for each of the matrixes whether a transform mode capable of decreasing the bus transition number exists, determining that the matrix needs to be transformed, determining a transform mode for transforming the matrix, and replacing the initial matrix with the transformed matrix. Then, forming a new matrix to be transmitted from matrixes which do not need to be transformed and matrixes which have been transformed. Thereafter, first generating a transform information word indicating transform states of the respective matrixes and then attaching the transform information word to the matrix to be transmitted to form an encoded matrix for actual transmission.

19 Claims, 10 Drawing Sheets

302

| Bit combination | Transform state |
|---|---|
| 1 | Unchanged |
| 0 | Transposed |

| Bit combination | Transform state |
|---|---|
| 1 | Unchanged |
| 0 | Even-column-inverted |

| Bit Combination | Transform state |
|---|---|
| 00 | Unchanged |
| 01 | Transposed |
| 10 | Even-column-inverted |

Fig. 3(c)

BUS ENCODING/DECODING METHOD AND BUS ENCODER/DECODER

CROSS-REFERENCE TO RELATED APPLICATION

This application claims priority under 35 U.S.C. §119 from Chinese Patent Application No. 200810001500.1 filed on Jan. 29, 2008, the entire contents of which are incorporated herein by reference.

BACKGROUND OF THE INVENTION

1. Field of the Invention

The present invention relates to a bus encoding/decoding method and a corresponding bus encoder/decoder. More particularly, the present invention relates to a bus encoding/decoding method and a corresponding bus encoder/decoder capable of reducing the power consumption of an input/output (I/O) circuit.

2. Description of Related Art

Currently, energy and environment issues are global concerns. For a computing system, pursuing reducing the power from the chip level to the system level is an important issue. When the power of the computing system increases, the overhead for powering and cooling the system will increase at an even higher rate. Therefore, chip manufacturers, such as IBM, Intel, AMD, and Sun, for example, are trying to reduce the power consumed by their chips and systems.

The computing system generally consists of a processor and a peripheral input/output (I/O) circuit. Accordingly, the power consumption of the computing system consists of the power of the processor and the power of the I/O circuit (referred to here as I/O power). Currently, many methods for reducing the power of the processor have been proposed as approaches for reducing the power of the computing system. For example, Intel has proposed a power source managing method which reduces the operating voltage and the frequency of the central processing unit (CPU) when the load of the CPU is low so as to reduce the power requirement of the CPU. However, this method does not mention reducing the I/O power. The I/O power is about 50 percent of the power of the computing system when the Intel method is not used. However, when the method is used, the ratio of the I/O power increases to 70 percent or higher to result in an imbalance between the processor power and the I/O power, because the processor power is reduced to about 10 percent of its original value and the I/O power remains relatively unchanged. Moreover, it has been found that the percentage of the I/O power for a mobile device can be up to 80 percent of the total. Therefore, as another approach for reducing the power of the computing system, it is increasingly important to reduce the I/O power.

The I/O power consists of a dynamic I/O power and a static I/O power. It has been proven that the dynamic I/O power can be represented by the following equation:

$$P = C \cdot N \cdot V_{DD}^2 \cdot f \quad (1)$$

where P is the dynamic I/O power, C is the equivalent capacitance of the I/O circuit, $V_{DD}$ is the operating voltage, f is the operating frequency, and N is the bus transition number. The bus transition number refers to the number of times of level transitions (or inversions) of a bus when data having different logic values are transmitted via the bus; specifically, for example, after a first bit having a first logic value (0 or 1) is transmitted via the bus, it is necessary to switch (or invert) the level on the bus from the first logic value to a second logic value to transmit a second bit if the second bit to be transmitted next has the second logic value (1 or 0), different from the first logic value, which corresponds to one bus transition; when one word is transmitted via the bus, the bus transition number is the total number of the level transmission at the time of transmitting the word. It is shown in the above equation (1) that the I/O power is directly proportional to the bus transition number N when the other conditions remain unchanged. Thus, it is also possible to reduce the I/O power, other than by reducing the operating voltage and the frequency, by decreasing N.

Many methods have been proposed to decrease the bus transition number. For example, a method was proposed in "Bus-invert Coding for Low-Power I/O", Mircea R. Stan and Wayne P. Burleson, IEEE Transactions on Very Large Scale Integration (VLSI) Systems, Volume 3, Issue 1 (March 1995) pp. 49-58.

In the above method, after a word D0 (64 bits) is transmitted, it is checked whether more than one half of the bits of the word D0 need to be switched to transmit the next word D1 (64 bits). That is, it is checked whether the number of different bits between the word D0 and the word D1 are more than one half (32 bits) of the 64 bits. If so, all bits of the word D1 are switched (or inverted) so that at most 32 instance of bus transition are required. Meanwhile, transform information is generated to indicate whether the transmitted word is inverted, and an additional signal line is used to transmit the transform information. This method can decrease the bus transition number, but an optimum result may not be obtained by processing all data using one transform mode (i.e., inverting), because it is difficult to predict the mode of the transmitted data. Moreover, this method needs to add an additional signal line, which will result in incompatibility of the circuit design.

As to other methods proposed to decrease the bus transition number, they either need an additional signal line, or need a complicated algorithm to deduce the bus encoding scheme, or are only applicable for an address bus. None of these methods consider the encoding and the transmitting of data from a temporal and spatial viewpoint.

Therefore, a bus encoder/decoder and a bus encoding/decoding method for reducing the I/O power by decreasing the bus transition number are needed. These need to be not only applicable for an address bus, but also applicable for a data bus, and have good compatibility with existing systems.

SUMMARY OF THE INVENTION

The present invention is proposed in view of the above problems. An object of the present invention is to provide a matrix-transform-based bus encoder and bus encoding method and a corresponding bus decoder and bus decoding method, where the bus encoder and bus encoding method are capable of decreasing the bus transition number of the data actually transmitted to an I/O circuit by selectively transforming data before transmitting the data to the I/O circuit, so as to reduce the I/O power and the power of the computing system, and to have good compatibility with existing systems.

According to an aspect of the present invention, there is provided a method of encoding data transmitted in a manner of bursts via a parallel bus, where the width of the parallel bus is n bits and each of the bursts includes m data words with m and n being natural numbers, the method includes an organizing step of organizing data of the k bursts into (p*q) number of $L_i$*$C_j$ matrixes, where k, p, q, i, j, $L_i$ and $C_j$ are natural numbers, i=1, ..., p, j=1, ..., q, and $$\sum_{i=1}^{p} L_i = n, \sum_{j=1}^{q} C_j = k*m;$$

a determining step of determining, for each of the $L_i*C_j$ matrixes, whether a transform mode capable of decreasing a bus transition number of the matrix exists, and determining that the matrix needs to be transformed, and determining a corresponding transform mode for transforming the matrix when the transform mode capable of decreasing the bus transition number of the matrix exists; a transforming step of transforming the matrix which is determined to need to be transformed by using the determined corresponding transform mode for transforming the matrix, and replacing the matrix which is determined to need to be transformed with the transformed matrix; a forming step of forming a matrix which is determined to not need to be transformed and the replaced matrix into an n*(k*m) matrix to be transmitted; a generating step of generating an n-bit transform information word indicating transform states of the (p*q) number of $L_i*C_j$ matrixes; and an attaching step of attaching the transform information word to the n*(k*m) matrix to be transmitted to form an encoded matrix to be actually transmitted.

According to another aspect of the present invention, there is provided an encoder for encoding data transmitted in a manner of bursts via a parallel bus, wherein a width of the parallel bus is n bits and each of the bursts includes m data words with m and n being natural numbers, the encoder comprises an organizing unit for organizing data of the k bursts into (p*q) number of $L_i*C_j$ matrixes, where k, p, q, i, j, $L_i$ and $C_j$ are natural numbers, i=1, . . . , p, j=1, . . . , q, and $$\sum_{i=1}^{p} L_i = n, \sum_{j=1}^{q} C_j = k*m;$$

a determining unit for determining, for each of the $L_i*C_j$ matrixes, whether a transform mode capable of decreasing a bus transition number of the matrix exists, and determining that the matrix needs to be transformed and determining a corresponding transform mode for transforming the matrix when the transform mode capable of decreasing the bus transition number of the matrix exists; a transforming unit for transforming the matrix which is determined to need to be transformed by using the determined corresponding transform mode for transforming the matrix, and replacing the matrix which is determined to need to be transformed with the transformed matrix; a forming unit for forming a matrix which is determined to not need to be transformed and the replaced matrix into an n*(k*m) matrix to be transmitted; a generating unit for generating an n-bit transform information word indicating transform states of the (p*q) number of $L_i*C_j$ matrixes; and an attaching unit for attaching the transform information word to the n*(k*m) matrix to be transmitted to form an encoded matrix to be actually transmitted.

According to still another aspect of the present invention, there is provided a method of decoding encoded data transmitted via a parallel bus, wherein the width of the parallel bus is n bits, the encoded data include an n-bit transform information word and data of k bursts, and each of the bursts includes m data words, where k, m and n are natural numbers, the method comprises an extracting step of extracting the transform information word from the encoded data according to predefined transform-information-word position information; an organizing step of organizing the remaining data of the encoded data into (p*q) number of $L_i*C_j$ matrixes according to a predefined number of matrixes and predefined sizes of the respective matrixes, where p, q, i, j, $L_i$ and $C_j$ are natural numbers, i=1, . . . , p, j=1, . . . , q, and $$\sum_{i=1}^{p} L_i = n, \sum_{j=1}^{q} C_j = k*m;$$

a determining step of determining transform states of each of the $L_i*C_j$ matrixes according to the transform information word; an inversely-transforming step of performing a corresponding inverse transform on a transformed matrix in the (p*q) number of $L_i*C_j$ matrixes and replacing the transformed matrix with the inversely-transformed matrix, and keeping a matrix which is determined to be not transformed unchanged, according to the determined transform states of each of the $L_i*C_j$ matrixes; and a forming step of forming the matrix which is determined to be not transformed and the replaced matrix into an n*(k*m) matrix as an original data matrix.

According to yet another aspect of the present invention, there is provided a decoder for decoding encoded data transmitted via a parallel bus, wherein the width of the parallel bus is n bits, the encoded data include an n-bit transform information word and data of k bursts, and each of the bursts includes m data words, where k, m and n are natural numbers, the decoder comprises an extracting unit for extracting the transform information word from the encoded data according to predefined transform-information-word position information; an organizing unit for organizing the remaining data of the encoded data into (p*q) number of $L_i*C_j$ matrixes according to a predefined number of matrixes and predefined sizes of the respective matrixes, where p, q, i, j, $L_i$ and $C_j$ are natural numbers, i=1, . . . , p, j=1, . . . , q, and $$\sum_{i=1}^{p} L_i = n, \sum_{j=1}^{q} C_j = k*m;$$

a determining unit for determining transform State s of each of the $L_i*C_j$ matrixes according to the transform information word; an inversely-transforming unit for performing a corresponding inverse transform on a transformed matrix in the (p*q) number of $L_i*C_j$ matrixes and replacing the transformed matrix with the inversely-transformed matrix, and keeping a matrix which is determined to be not transformed unchanged, according to the determined transform states of each of the $L_i*C_j$ matrixes; and a forming unit for forming the matrix which is determined to be not transformed and the replaced matrix into an n*(k*m) matrix as an original data matrix.

According to still another aspect of the present invention, there is provided a computer readable article of manufacture tangibly embodying computer readable instructions for executing a computer implemented method of encoding data transmitted in a manner of bursts via a parallel bus, wherein the width of the parallel bus is n bits and each of the bursts includes m data words with m and n being natural numbers.

When data need to be transmitted to an I/O circuit so as to be transmitted outside, the encoding method/encoder according to the present invention organize the data to be transmitted into one or more matrixes from a temporal and spatial viewpoint, and then selectively perform a matrix transform on the one or more matrixes to decrease the bus transition number of data actually transmitted to the I/O circuit, so as to reduce the I/O power and the power of the whole computing system. The encoding method/encoder according to the present invention have good compatibility with existing systems, since they need no additional signal line.

BRIEF DESCRIPTION OF THE DRAWINGS

The above and other objects, features and advantages of the invention will become more apparent from the detail description of embodiments of the present invention taken in conjunction with the accompanying drawings, in which:

FIGS. 3(a), 3(b) and 3(c) show examples of a transform table according to the present embodiment, where 3(a) represents transform table 302, 3(b) represents transform table 304 and 3(c) represents transform table 306;

DETAILED DESCRIPTION OF THE PREFERRED EMBODIMENTS

Preferred embodiments of the present invention will be described in detail with reference to the accompanying drawings. Like reference signs refer to similar elements throughout the drawings. It is to be understood that the embodiments described herein are only illustrative, and should not be construed to limit the scope of the invention. It will be appreciated by those skilled in the art that various modifications and combinations may be made to the embodiments without departing from the spirit and scope of the invention.

The present embodiment is based on the following observations:

(1) As shown in above equation (1), the I/O power is directly proportional to the total bus transition number at the time of transmitting data when other conditions remain unchanged, therefore, the I/O power can be reduced by decreasing the total bus transition number of the transmitted data.

(2) Since the power consumed by reducing bit transitions (or inversions) at the time of transmitting data via an I/O circuit by encoding or other methods in a CPU is much less than the power consumed by transmitting the data directly via the I/O circuit without any processing, the I/O power can be largely reduced by processing the data to be transmitted in advance to decrease the bit transition number at the time of transmitting the data via the I/O circuit.

(3) Currently, most of I/O circuits and storage systems transmit or receive data in a manner of bursts, i.e., transmit or receive a plurality of data words continuously in one burst at a time, instead of transmitting or receiving only one data word (number of data words in one burst is defined as the burst length of the burst). For example, most of storage systems continuously transmit 8 data words in one burst. That is, the burst length is 8.

Figure 1:
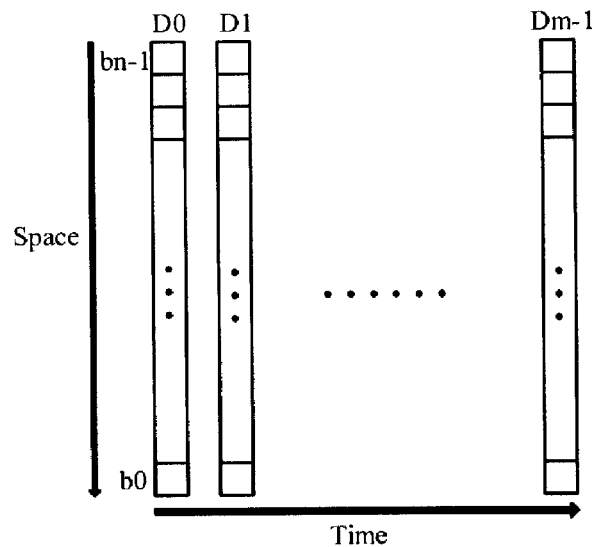
FIG. 1 is a diagram showing an example of organizing data of one burst transmitted via a parallel bus into one matrix according to the present embodiment.

Additionally, some storage systems continuously transmit data of one cache line in one burst. The burst length is longer at this time. It is to be noted that the burst length is fixed for a given system. In addition, the term "word" mentioned here may be defined flexibly according to requirements and the system actually used; for example, a word may be defined to have one or more bytes. When data are transmitted via a parallel bus commonly used in computing systems, data of one or more bursts can be organized into one or more matrixes from a temporal and spatial point of view, where one dimension is the spatial dimension, i.e., the data bits transmitted in parallel by the parallel bus, and the other dimension is the temporal dimension, which corresponds to a plurality of words continuously transmitted in the one or more bursts. FIG. 1 is a diagram showing an example of organizing data of one burst transmitted via a parallel bus into one matrix according to the present embodiment.

As shown in FIG. 1, the width of the parallel bus is n bits, that is, the parallel bus has n transmission lines and can transmit data of n bits, $b0, b1, \ldots, bn\text{-}1$, in parallel. An I/O circuit transmits m words, $D0, D1, \ldots, Dm\text{-}1$, continuously in one burst at a time; that is, the burst length is m, and the m words have a relationship of being continuous in time. In the specification, a word is defined to have the same number of bits as the width of the parallel bus, i.e., n bits, for the purpose of simplicity. At this time, m words transmitted continuously in one burst by the I/O circuit may be organized into one $n*m$ matrix by having n-bit data (corresponding to n transmission lines) of one word transmitted in parallel via the parallel bus as n rows of the matrix (the spatial dimension), and having the m words transmitted continuously in temporal as m columns of the matrix (the temporal dimension), if considering the transmitted data from the spatial and temporal point of view. In other words, elements of one row of the matrix are bits transmitted sequentially via one corresponding transmission line of the parallel bus in the m words, and elements of one column of the matrix are all bits of one corresponding word transmitted via the parallel bus.

Besides being organized into one $n*m$ matrix, the data of the one burst may also be organized into a plurality of matrixes of other sizes which form the $n*m$ matrix; for example, in the above example, the data can be organized into two $n/2*m$ matrixes, four $n/2*m/2$ matrixes or a plurality of matrixes of other sizes which form the $n*m$ matrix. Besides the example shown in FIG. 1, data of a plurality of bursts may be organized into one or more matrixes. In other words, data of k ($k \geq 1$) bursts may be organized into ($p*q$) number of $L_i*C_j$ matrixes, where k, p, q, i, j, $L_i$ and $C_j$ are natural numbers, $i=1, \ldots, p$, $j=1, \ldots, q$, and $$\sum_{i=1}^{p} L_i = n, \sum_{j=1}^{q} C_j = k*m.$$

Here, n and (k*m) may be equal to each other (corresponding to a square matrix) or not equal to each other (corresponding to a rectangular matrix).

Based on the above observations, a bus encoder and a bus encoding method according to the present embodiment are designed.

Figure 2:
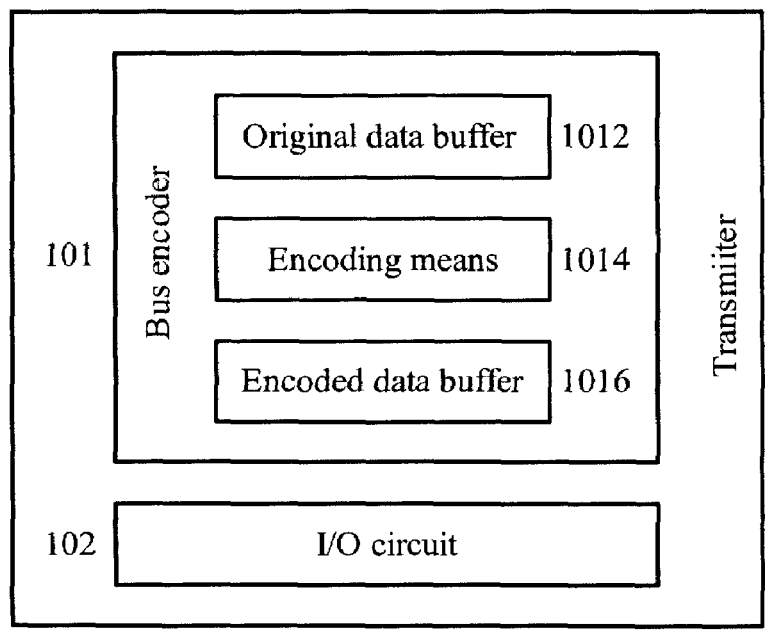
FIG. 2 is a block diagram illustrating a bus encoder and a bus decoder according to an embodiment of the present invention.
Figure 2:
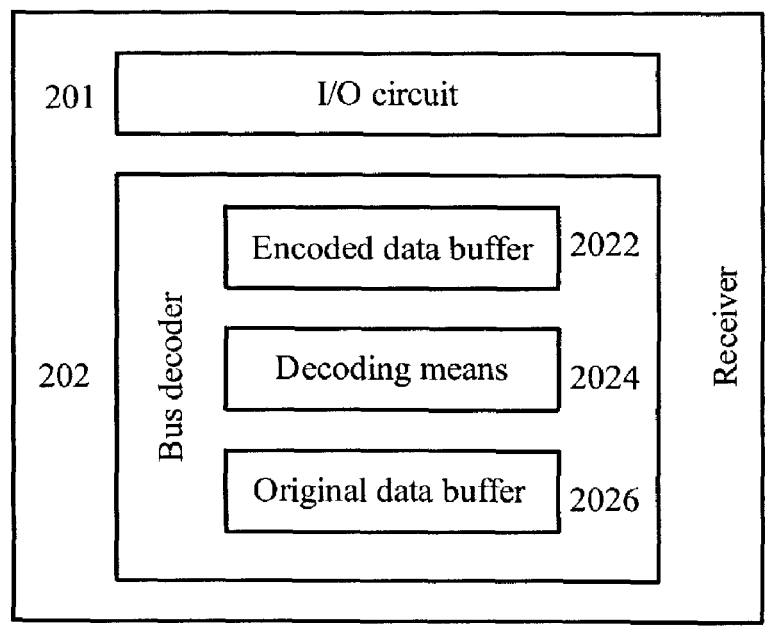

Below, a bus encoder and a bus decoder according to the present embodiment will be described with reference to FIG. 2. FIG. 2 is a block diagram illustrating a bus encoder and a bus decoder according to an embodiment of the present invention.

As shown in FIG. 2, a transmitter 100 and a receiver 200 are connected to each other through a parallel bus 50. The transmitter 100 transmits data to the receiver 200 via the parallel bus 50.

The transmitter 100 includes a bus encoder 101 and an I/O circuit 102 connected to the bus encoder 101. The bus encoder 101 is used for encoding data to be transmitted before the transmitter 100 transmits the data to the receiver 200 so as to decrease the bus transition number at the time of transmitting the encoded data, and providing the encoded data to the I/O circuit 102. The I/O circuit 102 is connected to an I/O circuit in the receiver 200 via the parallel bus 50, and is used for transmitting the encoded data received from the bus encoder 101 to the I/O circuit in the receiver 200 via the parallel bus 50. The bus encoder 101 may be implemented by a combination of hardware, performing functions described below, or by a well-known processor (e.g., CPU) or controller including a data buffer in combination with computer software for performing functions described in the present embodiment.

The bus encoder 101 includes an original-data buffer 1012, an encoding means 1014 connected to the original-data buffer 1012, and an encoded-data buffer 1016 connected to the encoding means 1014 and the I/O circuit 102.

The original-data buffer 1012 is used to store original data to be transmitted from the transmitter 100 to the receiver 200. The original data may be a plurality of continuous data words belonging to one or more bursts.

The original-data buffer 1012 is also used to store matrix organizing information and transform-information-word position information. The matrix organizing information indicates a number (i.e., k) of bursts which will be organized into a matrix/matrixes, and a number (i.e., p*q) of matrixes into which data of the number of bursts are organized and sizes (i.e., $L_i*C_j$, i=1, ..., p, j=1, ..., q) of the respective matrixes. The transform-information-word position information indicates the position of a transform information word in the transmitted encoded data. The matrix organizing information and the transform-information-word position information are predefined by a user. It is noted that although the position of the transform information word in the transmitted encoded data is variable, the position is fixed and is known by a transmitter and a receiver for a given system consisting of the transmitter and the receiver. The transform information word is used to indicate transform states of the respective organized matrixes. It is to be appreciated that different definitions may be given to the transform information word according to different cases.

Moreover, the original-data buffer 1012 is also used to store a transform table predefined by the user. One or more matrix transform modes that may be used for transforming the matrixes, and particular combinations of one or more bits which will be used in the transform information word to indicate transform states of the matrixes are predefined in the transform table. Specifically, when a certain matrix transform mode is applied to a matrix, a bit(s) corresponding to the matrix in the transform information word is set to a particular bit combination which is predefined in the transform table to indicate a transform state corresponding to the matrix transform mode, so as to indicate to the receiver that the matrix transform mode has been applied to the matrix, in other words, so as to indicate to the receiver that the received corresponding matrix is a result of applying the matrix transform mode to its original matrix. Conversely, when one or more bits corresponding to a certain matrix in the transform information word is the same as a bit combination predefined in the transform table, this means that the matrix is in a transform state indicated by the bit combination, and its original matrix can be obtained simply by performing a corresponding inverse transform on the matrix at this time.

FIGS. 3(a), 3(b) and 3(c) show examples of a transform table according to the present embodiment. As shown in FIG. 3(a), one available matrix transform mode (i.e., "transposition") and two bit combinations are predefined in a transform table 302. In the example, only one bit is used to indicate transform states, where a bit "0" indicates that a corresponding matrix is in a transposed state; that is, the matrix is a result of performing a transposition transform on an original matrix; and a bit "1" indicates that a corresponding matrix is not transformed; that is, the corresponding matrix is same as its original matrix. As shown in FIG. 3(b), one available matrix transform mode (i.e., "even-column-inverting") and two bit combinations are predefined in a transform table 304. Also, in the example, only one bit is used to indicate transform states, where a bit "0" indicates that a corresponding matrix is in a state where its even columns are inverted, that is, the matrix is a result of inverting even columns of another matrix; a bit "1" indicates that a corresponding matrix is not transformed. That is, the corresponding matrix is the same as its original matrix. As shown in FIG. 3(c), two available matrix transform modes (i.e., "transposition" and "even-column-inverting") and three bit combinations are predefined in a transform table 306, where a bit combination "00" indicates that a corresponding data matrix is not transformed, a bit combination "01" indicates that a corresponding data matrix is in a transposed state, and a bit combination "10" indicates that a corresponding data matrix is in a state where its even columns are inverted.

t is to be appreciated that the above transform tables are only illustrative and not restrictive. In practice, besides the transposition transform and the even-column-inverting transform, one or more other available transform modes can be predefined or added in the transform tables according to actual situations (for example, the distribution of "1" and "0" in data that a transmitter usually transmits) and actual needs. In addition, the number of bits in a bit combination for indicating the transform state can be other values. Moreover, the form of a transform table is not limited to those illustrated in FIGS. 3(a), 3(b) and 3(c), and can be other forms as long as the forms can reflect the above information clearly.

It is to be appreciated that, although the matrix organizing information, the transform-information-word position information and the transform table, are stored in the original-data buffer 1012 here, this is not restrictive. They can also be stored in a encoded-data buffer 1016 described later or another memory (not shown) which the encoding means 1014 can access.

Turning back to FIG. 2, the encoding means 1014 reads the matrix organizing information from the original-data buffer 1012, and reads k bursts sequentially from the original-data buffer 1012 according to the number of bursts k predefined in the matrix organizing information. The encoding means 1014 then organizes data words in the bursts into one or more matrixes in the above-mentioned organizing manner according to the matrix organizing information.

In particular, as described above, it is assumed that the width of the parallel bus 50 is n bits, and the burst length is m. The encoding means 1014 reads the data words of the k bursts from the original-data buffer 1012, and organizes the k*m data words into (p*q) number of $L_i*C_j$ matrixes in the above-mentioned organizing manner according to the number of matrixes (p*q) and the size of each of the matrixes ($L_i*C_j$, i=1, ..., p, j=1, ..., q) which are predefined in the matrix organizing information, where $$\sum_{i=1}^{p} L_i = n, \text{ and } \sum_{j=1}^{q} C_j = k*m.$$

Subsequently, the encoding means 1014 reads the predefined transform table from the original-data buffer 1012, and determines an available transform mode(s). Then, it checks, for each of the $L_i*C_j$ matrixes, whether there is a transform mode capable of decreasing the bus transition number (i.e., the sum of the bus transition numbers at the time of transmitting the data of the matrix) of the matrix in the available transform mode(s), so as to determine whether the matrix needs to be transformed. When there is such a transform mode, it determines that the matrix needs to be transformed and then determines a corresponding transform mode for transforming the matrix.

Specifically, for each of the $L_i*C_j$ matrixes, the encoding means 1014 selects sequentially each of the available transform mode(s), and checks whether the selected transform mode can decrease the bus transition number of the matrix. For example, the encoding means 1014 may transform the matrix by using the selected transform mode to obtain a transformed matrix, calculate the sum of the bus transition numbers of respective rows of the transformed matrix to obtain the bus transition number of the transformed matrix, and then compare the bus transition number of the transformed matrix with the bus transition number of the original matrix. If the bus transition number of the transformed matrix is more than or equal to the bus transition number of the original matrix, the selected transform mode cannot decrease the bus transition number of the matrix; conversely, if the bus transition number of the transformed matrix is less than the bus transition number of the original matrix, the selected transform mode can decrease the bus transition number of the matrix.

When it is determined that the selected transform mode can decrease the bus transition number, the encoding means 1014 determines that the matrix needs to be transformed, and determines the selected transform mode as the corresponding transform mode for transforming the matrix without continuing to check other transform modes; on the other hand, when the encoding means 1014 determines that the selected transform mode cannot decrease the bus transition number, the encoding means 1014 selects another available transform mode from the available transform mode(s), and repeats the above checking steps. In this way, the encoding means 1014 checks all of the available transform mode(s) sequentially, and stops the check when it finds a transform mode capable of decreasing the bus transition number of the matrix.

However, if the encoding means 1014 has checked all of the available transform mode(s) and found no transform mode that can decrease the bus transition number of the matrix, the encoding means 1014 determines that the matrix does not need to be transformed. Alternatively, when the encoding means 1014 finds a transform mode capable of decreasing the bus transition number of the matrix, it records a quantity by which the transform mode decreases the bus transition number, and continues to check whether there are other transform modes capable of decreasing the bus transition number of the matrix in the available transform mode(s), instead of stopping checking other available transform modes as described above, so as to find all transform modes capable of decreasing the bus transition number of the matrix and determine corresponding quantities by which the bus transition number is decreased. Then, the encoding means 1014 selects one transform mode which decreases the bus transition number of the matrix most as the corresponding transform mode for transforming the matrix.

For example, in the case where the transform table shown in FIG. 3(a) is adopted and data are organized into one n*m matrix, the encoding means 1014 reads the transform table 302, determines that the available transform mode is the transposition transform, and then checks whether the transposition transform can decrease the bus transition number of the n*m matrix. If so, it determines that the matrix needs to be transformed, and determines the transposition transform as the corresponding transform mode for transforming the matrix; and if not, it determines that the matrix does not need to be transformed. For example, in the case where the transform table shown in FIG. 3(c) is adopted and data are organized into one n*m matrix, the encoding means 1014 reads the transform table 306, determines the available transform modes are the transposition transform and the even-column-inverting transform.

Then, the encoding means 1014 selects the transposition transform first, and checks whether the transposition transform can decrease the bus transition number of the n*m matrix. If so, it determines that the matrix needs to be transformed, and determines to use the transposition transform to transform the matrix; and if not, the encoding means 1014 checks whether the even-column-inverting transform can decrease the bus transition number. If so, it determines that the matrix needs to be transformed, and determines the even-column-inverting transform as the corresponding transform mode for transforming the matrix; and if not, it determines that the matrix does not need to be transformed since there are only two available transform modes. Alternatively, when the encoding means 1014 determines that the transposition transform can decrease the bus transition number of the matrix, it continues to check whether the even-column-inverting transform can decrease the bus transition number. If it determines that the even-column-inverting transform can also decrease the bus transition number, it selects one transform mode that decreases the bus transition number more from the two transform modes as the corresponding transform mode actually used for transforming the matrix. Otherwise, it determines the transposition transform as the corresponding transform mode for transforming the matrix.

Next, when it is determined that none of the (p*q) number of $L_i*C_j$ matrixes needs to be transformed, the encoding means 1014 keeps the (p*q) number of $L_i*C_j$ matrixes unchanged without performing any processing on them. On the other hand, when it is determined that there are matrixes which need to be transformed in the (p*q) number of $L_i*C_j$ matrixes and corresponding transform modes for transforming the matrixes are determined, the encoding means 1014 transforms the matrixes which need to be transformed by using the determined corresponding transform modes respectively, and replaces the matrixes (i.e., the original matrixes) with the corresponding transformed matrixes. The matrixes which do not need to be transformed remain unchanged. Then, the encoding means 1014 forms the matrixes which do not need to be transmitted (if any) and the replaced matrixes into one n*(k*m) matrix to be transmitted.

Subsequently, the encoding means 1014 generates, according to the transform table, a transform information word for indicating whether each of the $L_i*C_j$ matrixes is transformed and the used transform mode when it is transformed, and attaches the transform information word as an additional word to (e.g., before or after) the n*(k*m) matrix to be transmitted according to the predefined transform-information-word position information, thereby forming an encoded matrix actually to be transmitted to the receiver 200 via the I/O circuit 102.

In particular, the encoding means 1014 generates a transform information word first, and then sets a bit(s) for indicating the transform state of each of the $L_i*C_j$ matrixes in the transform information word to a bit combination corresponding to the transform state of the matrix according to the transform table. For example, in the case where the transform table 302 shown in FIG. 3(a) is adopted, a bit for indicating the transform state of an untransformed matrix (i.e., a matrix which does not need to be transformed) in the transform information word is set to 1, and a bit for indicating the transform state of an transposed matrix is set to 0; in the case where the transform table 306 shown in FIG. 3(c) is adopted, bits for indicating the transform state of an untransformed matrix in the transform information word are set to "00", bits for indicating the transform state of a transposed matrix are set to "01", and bits for indicating the transform state of an even-column-inverted matrix are set to "10". Then, the encoding means 1014 reads the transform-information-word position information from the original-data buffer 1012, and attaches the transform information word as an additional word before or after the n*(k*m) matrix to be transmitted according to the position of the transform information word predefined in the position information, so as to form the encoded matrix actually to be transmitted to the receiver 200.

It is to be noted that bits respectively used for indicating transform states of respective matrixes in a transform information word may be predefined by a user in the transmitter (or the encoding means) and the receiver (or the decoding means) based on factors, such as the number of available transform modes, the number of the organized matrixes, and so on, or may be allocated automatically by the encoding means and the decoding means based on a same allocating rule. For example, one or more predetermined bits of the transform information word may be predefined as the bit(s) for indicating a transform state of a matrix in the encoding means and the decoding means, or one or more predetermined bits of the transform information word may be automatically allocated to a certain matrix by the encoding means and the decoding means in common to indicate a transform state of the matrix.

Furthermore, after bits for indicating transform states of matrixes have been predefined, the remaining bits of the transform information word (if any) can be set arbitrarily, because the remaining bits do not have particular meaning. However, it is preferred to set the remaining bits to be the same as corresponding bits (i.e., neighboring bits respectively transmitted on the same transmission lines of the parallel bus as the remaining bits) of a word neighboring the transform information word in the n*(k*m) matrix to be transmitted, so as to decrease as much as possible the bus transition number increased due to the attachment of the transform information word.

Furthermore, above, the encoding means 1014 generates only one common transform information word for the case where the original data are organized into a plurality of matrixes. However, the present embodiment is not limited to that, and the encoding means 1014 may also generates one additional information word for each of the plurality of matrixes respectively, and then attach the generated additional information words before or after the n*(k*m) matrix to be transmitted, or before or after corresponding respective matrixes. This may be predefined correspondingly by a user in the encoding means and the decoding means.

Subsequently, the encoding means 1014 stores the encoded data of the formed encoded matrix into the encoded-data buffer 1016 in a transmission order. The formed encoded matrix is the elements of the encoded matrix. The encoded-data buffer 1016 is used to store sequentially the encoded data received form the encoding means 1014.

The transmitter 100 transmits the encoded data stored in the encoded-data buffer 1016 to the receiver 200 via the I/O circuit 102 and the parallel bus 50 according to a well-known method. It is to be noted that, since the I/O circuit transmits data in a unit of a burst, the I/O circuit may be rendered to transmit additionally one word (when one transform information word is generated) or a plurality of words (when a plurality of transform information words of the same number are generated) when the transform information word(s) is attached to data of one or more bursts, so as to transmit the encoded data completely to the receiver 200.

Above, after completing the encoding of all of the data of the k bursts, the encoding means 1014 stores the obtained encoded data into the encoded-data buffer 1016, and then the encoded data are sent sequentially via the I/O circuit. However, the present embodiment is not limited to that. In some cases, for the k bursts, it is also possible to transmit previously encoded data concurrently with encoding current data so as to reduce the time delay caused by encoding the data of the bursts. For example, when the data of the k bursts are organized into one matrix and the matrix needs to be transformed, data of a previously processed column can be transmitted to the receiver sequentially concurrently with transforming data of a current column, instead of transmitting all data of the matrix after completing the processing of all the data. This variation may be properly extended to other cases of organizing matrixes, and is also included in the scope of the present embodiment.

A bus decoder according to an embodiment of the present invention will be described below with reference to FIG. 2. As shown in FIG. 2, the receiver 200 comprises an I/O circuit 201 and a bus decoder 202 connected to the I/O circuit 201.

The I/O circuit 201 is used to receive the encoded data of the k bursts transmitted from the transmitter 100 to the receiver 200 via the I/O circuit 102 and the parallel bus 50, and store the encoded data successively in an encoded-data buffer 2022 included in the bus decoder 202.

The bus decoder 202 includes the encoded-data buffer 2022 connected to the I/O circuit 201, a decoding means 2024 connected to the encoded-data buffer 2022, and an original-data buffer 2026 connected to the decoding means 2024. The bus decoder may be implemented by a combination of hardware performing functions described below, or by a well-known processor (e.g., CPU) or controller including a data buffer in combination with computer software for performing functions described in the present embodiment. The encoded-data buffer 2022 is used to store sequentially the encoded data received from the I/O circuit 201.

The original-data buffer 2026 is used to store decoded data received from the decoding means 2024. The original-data buffer 2026 is also used to store matrix organizing information, transform-information-word position information, and a transform table, which are the same as those stored in the original-data buffer 1012 and thus a detail description of which are omitted here for simplicity. Again, it is to be appreciated that although the matrix organizing information, the transform-information-word position information and the transform table are stored in the original-data buffer 2026, this is not restrictive, and they may also be stored commonly or respectively in the encoded-data buffer 2022 or another memory (not shown) which the decoding means 2024 can access.

The decoding means 2024 is used to decode the encoded data to obtain their original data. In particular, the decoding means 2024 reads the received encoded data from the encoded-data buffer 2022, reads the transform-information-word position information from the original-data buffer 2026, and then extracts the transform information word from the read encoded data according to the position of the transform information word predefined in the position information. For example, if the position of the transform information word predefined in the position information is the end of the encoded data, the decoding means 2024 extracts a last word from the read encoded data as the transform information word; and if the position of the transform information word predefined in the position information is the beginning of the encoded data, the decoding means 2024 extracts a first word from the read encoded data as the transform information word.

Next, the decoding means 2024 reads the matrix organizing information from the original-data buffer 2026, and organizes the remaining encoded data into (p*q) number of $L_i*C_j$ matrixes in the above-mentioned matrix organizing manner based on a number of matrixes (i.e., p*q) and sizes of the respective matrixes which are predefined in the matrix organizing information, where i=1, . . . , p, j=1, . . . , q, and $$\sum_{i=1}^{p} L_i = n, \sum_{j=1}^{q} C_j = k*m.$$

Since the matrix organizing information stored in the original-data buffer 2026 is the same as that stored in the original-data buffer 1012, and the encoding means 1014 and the decoding means 2024 adopt the same matrix organizing manner, the (p*q) number of $L_i*C_j$ matrixes organized by the decoding means 2024 are the same as the (p*q) number of $L_i*C_j$ matrixes forming said n*(k*m) matrix to be transmitted as described above.

Subsequently, the decoding means 2024 reads the transform table from the original-data buffer 2026, and compares one or more bits for indicating transform states of the respective matrixes in the transform information word and bit combinations predefined in the transform table, so as to determine the transform states of the respective matrixes. As described above, the decoding means 2024 can know the one or more bits for indicating the transform states of the respective matrixes in the transform information word by means of a predefinition made by a user or an automatic allocation based on an allocating rule.

Next, if none of the (p*q) number of $L_i*C_j$ matrixes has been transformed, the decoding means 2024 does not performs any processing on them. On the other hand, if matrixes which have been transformed exist in the (p*q) number of $L_i*C_j$ matrixes, the decoding means 2024 performs corresponding inverse transforms on the transformed matrixes respectively to obtain their original matrixes, and replaces the matrixes with their original matrixes. The matrixes which are not transformed remain unchanged.

Finally, the decoding means 2024 forms the matrixes which are determined to be not transformed (if any) and the replaced matrixes into one n*(k*m) matrix, i.e., the original data matrix, and sequentially stores data of the n*(k*m) matrix into the original-data buffer 2026 as original data for use by other means.

Figure 4:
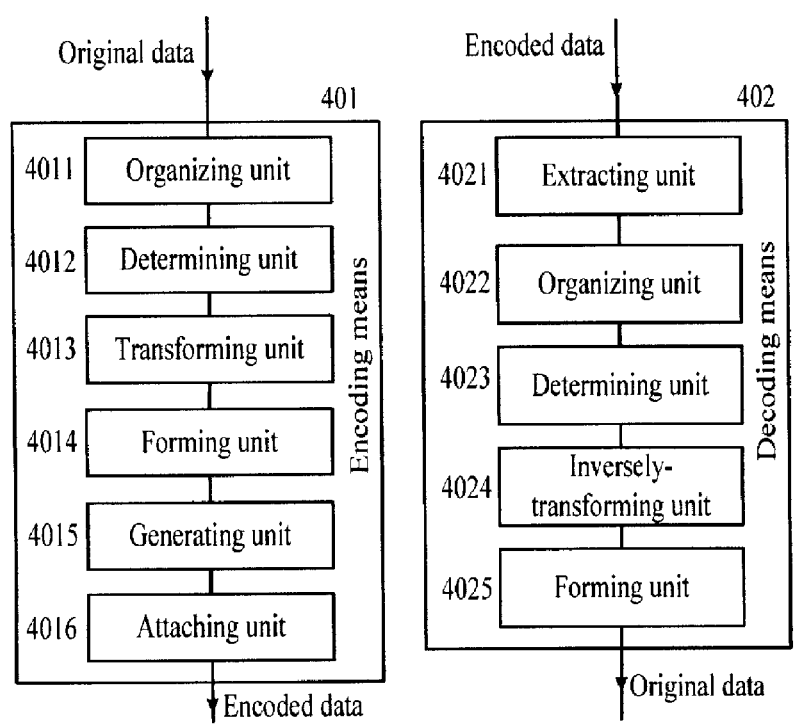
FIG. 4 shows a variation of an encoding means and a decoding means illustrated in FIG. 2.

It is to be appreciated that although a single means, i.e., the encoding means, is used to encode the data to be transmitted above, this is only illustrative and not restrictive. In practice, besides using the single means, an encoding means including a plurality of units may also be used to implement the above functions. For example, as shown in FIG. 4, an encoding means 401 including an organizing unit 4011, a determining unit 4012, a transforming unit 4013, a forming unit 4014, a generating unit 4015 and an attaching unit 4016 may be used to encode the data to be transmitted in a similar manner to that described above.

Specifically, the organizing unit 4011 organizes the data of the k bursts into the (p*q) number of $L_i*C_j$ matrixes in the manner described above; the determining unit 4012 determines, for each of the $L_i*C_j$ matrixes, whether a transform mode capable of decreasing the bus transition number of the matrix exists, and determines that the matrix needs to be transformed and determines the corresponding transform mode for transforming the matrix when the transform mode capable of decreasing the bus transition number of the matrix exists; the transforming unit 4013 transforms the matrix which is determined to need to be transformed by using the determined corresponding transform mode for transforming the matrix, and replaces the matrix which is determined to need to be transformed with the transformed matrix; the forming unit 4014 forms the matrix which is determined to not need to be transformed and the replaced matrix into the n*(k*m) matrix to be transmitted; the generating unit 4015 generates the n-bit transform information word indicating the transform states of the (p*q) number of $L_i*C_j$ matrixes; and the attaching unit 4016 attaches the transform information word to the n*(k*m) matrix to be transmitted to form the encoded matrix to be actually transmitted.

Likewise, the single decoding means 2024 described above can be replaced with a decoding means 402 including an extracting unit 4021, an organizing unit 4022, a determining unit 4023, an inversely-transforming unit 4024 and a forming unit 4025. Specifically, the extracting unit 4021 extracts the transform information word from the encoded data according to the predefined transform-information-word position information; the organizing unit 4022 organizes the remaining data of the encoded data into the (p*q) number of $L_i*C_j$ matrixes in the above manner; the determining unit 4023 determines the transform state of each of the $L_i*C_j$ matrixes according to the transform information word; the inversely-transforming unit 4024 performs a corresponding inverse transform on a matrix which is determined to have been transformed in the (p*q) number of $L_i*C_j$ matrixes according to the determined transform state of each of the $L_i*C_j$ matrixes and replaces the transformed matrixes with the inversely-transformed matrixes, and keeps a matrix which is determined to be not transformed unchanged; and the forming unit 4025 forms the matrix which is determined to be not transformed and the replaced matrixes into one n*(k*m) matrix as an original data matrix.

Those skilled in the art can of course design other means respectively having one or more of the above functions and/or a combination of the means according to actual needs, as long as the means can implement the above data encoding and decoding in common. Moreover, two separate buffers, i.e., the original-data buffer and the encoded-data buffer, are used above respectively in the encoder and the decoder, but this is not restrictive, and they can be combined into one buffer or divided into more buffers.

Since the bus encoder according to the present embodiment selectively transforms data before transmitting the data to the I/O circuit and the bus so as to decrease its bus transition number, the I/O circuit does not need to perform as many bus transitions. Thus, the I/O power is reduced.

Figure 5:
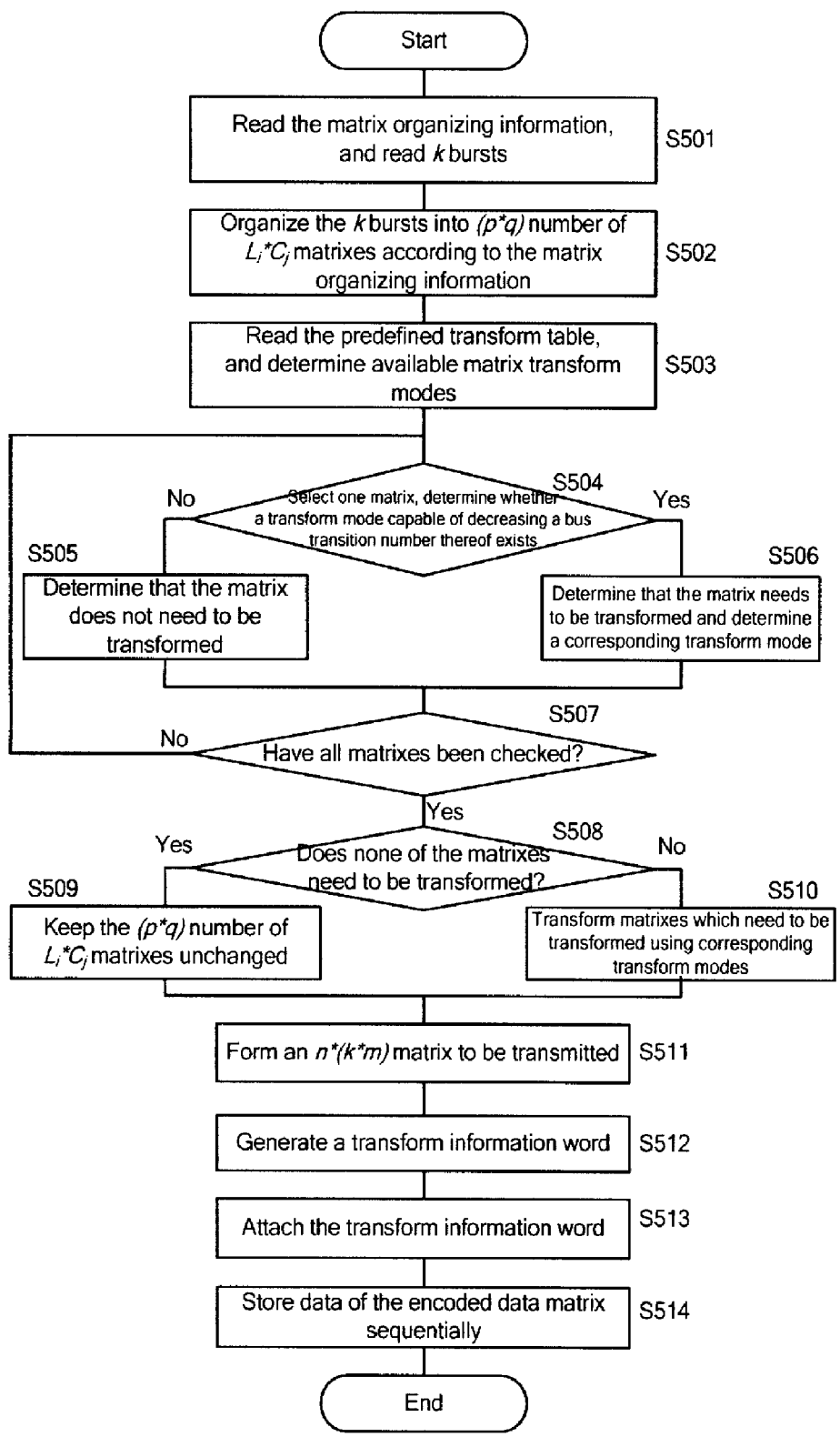
FIG. 5 is a flowchart showing a bus encoding method according to an embodiment of the present invention.

Below, a bus encoding method according to an embodiment of the present invention will be described in conjunction with FIGS. 2 and 5. FIG. 5 is a flowchart showing a bus encoding method according to an embodiment of the present invention.

As described above, the same matrix organizing information, the same transform-information-word position information and the same transform table have been predefined in the transmitter 100 and the receiver 200 respectively before data are transmitted and received, and they are stored in the original-data buffers 1012 and 2026 respectively. The detailed description of the information and the transform table is omitted for simplicity.

When there is data to be transmitted to the receiver 200 via the I/O circuit 102 and the parallel bus 50, the transmitter 100 stores the data in the original-data buffer 1012 sequentially. It is assumed that the width of the parallel bus is n, and the burst length is m, where n and m are natural numbers.

Referring to FIG. 5, in step S501, the encoding means 1014 reads the matrix organizing information from the original-data buffer 1012, and reads k bursts, totally n*(k*m) data bits, from the original-data buffer 1012 sequentially according to the number of the bursts k (k is a natural number larger than or equal to 1) predefined in the matrix organizing information.

In step S502, the encoding means 1014 organizes data words in the k bursts into (p*q) number of $L_i*C_j$ matrixes in the above-mentioned matrix organizing manner according to the number of matrixes (p*q) (p and q are natural numbers) predefined in the matrix organizing information, where i, j, $L_i$ and $C_j$ are natural numbers, i.e., positive integers, i=1, ..., p, j=1, ..., q, and $$\sum_{i=1}^{p} L_i = n, \sum_{j=1}^{q} C_j = k*m.$$

In step S503, the encoding means 1014 reads the predefined transform table from the original-data buffer 1012, and determines available matrix transform modes that are predefined in the transform table and can be used to perform matrix transforms on the (p*q) number of $L_i*C_j$ matrixes.

Then, in step S504, the encoding means 1014 selects one of the (p*q) number of $L_i*C_j$ matrixes, and checks whether there is a transform mode capable of decreasing the bus transition number of the matrix (i.e., the sum of the bus transition numbers at the time of transmitting data in the matrix) in the determined available transform modes, so as to determine whether the matrix needs to be transformed.

When it is determined that there is no such transform in step S504, the encoding means 1014 goes to step S505, where it determines that the matrix does not need to be transformed. Conversely, when it is determined in step S504 that there is such a transform, the encoding means 1014 goes to step S506, where it determines that the matrix needs to be transformed and determines a corresponding transform mode for transforming the matrix. The detailed operations in steps S504, S505 and S506 will be described later.

Next, in step S507, the encoding means 1014 determines whether all of the (p*q) number of $L_i*C_j$ matrixes are checked. If not, the encoding means 1014 returns to step S504, selects another matrix that is checked, and repeats steps S504-S506. On the other hand, if it is determined in step S507 that all of the matrixes have been checked, the encoding means 1014 goes to step S508, where it judges whether none of the matrixes needs to be transformed.

If it is determined in step S508 that none of the matrixes needs to be transformed, the encoding means 1014 keeps the (p*q) number of $L_i*C_j$ matrixes unchanged in step S509 without performing any processing on them. Conversely, when it is determined in step S508 that there are matrixes that need to be transformed, in step S510, the encoding means 1014 transforms the respective matrixes which need to be transformed by using the determined corresponding transform modes, replaces the respective matrixes which need to be transformed (i.e., the respective original matrixes) with the corresponding transformed matrixes, and keeps the matrixes which do not need to be transformed (if any) in the (p*q) number of $L_i*C_j$ matrixes unchanged. Then, in step S511, the encoding means 1014 forms the (p*q) number of $L_i*C_j$ matrixes composed of the matrixes which do not need to be transformed (whose number is 0 when it is determined that all of the matrixes need to be transformed) and the transformed matrixes (whose number is 0 when it is determined that none of the matrixes needs to be transformed) into an n*(k*m) matrix to be transmitted.

Next, in step S512, the encoding means 1014 generates a transform information word for indicating whether each of the $L_i*C_j$ matrix is transformed and the used transform mode when it is transformed according to the transform table. Specifically, the encoding means 1014 generates a transform information word first, and then sets a bit(s) for indicating the transform state of each of the $L_i*C_j$ matrixes in the transform information word to a bit combination corresponding to the transform state of the matrix according to the transform table. As described above, the bits respectively used for indicating the transform states of the respective matrixes in the transform information word may be predefined by a user in the transmitter (or the encoding means) and the receiver (or the decoding means) based on factors, such as the number of available transform modes, the number of the organized matrixes, for example, or may be allocated automatically by the encoding means and the decoding means based on a same allocating rule.

Furthermore, after the bits for indicating the transform states of the matrixes have been predefined, the remaining bits of the transform information word can be set arbitrarily, because the remaining bits do not have particular meanings. However, it is preferred to set the remaining bits to be the same as corresponding bits (i.e., neighboring bits respectively transmitted on the same transmission lines of the parallel bus as the remaining bits) of a word neighboring the transform information word in the n*(k*m) matrix to be transmitted, so as to decrease as much as possible the bus transition number increased due to the attachment of the transform information word.

Subsequently, in step S513, the encoding means 1014 reads the transform-information-word position information form the original-data buffer 1012, and attaches the transform information word as an additional word to the n*(k*m) matrix to be transmitted according to the position of the transform information word predefined in the position information, so as to form an encoded matrix actually to be transmitted to the receiver 200 via the I/O circuit 101 and the bus 50. It can be understood that the encoded data matrix has (k*m+1) columns, because one transform information word is attached. In addition, as described above, for the case where the original data are organized into a plurality of matrixes, the encoding means 1014 may also generate one additional information word for each of the matrixes, and then attach the generated additional information words before or after the n*(k*m) matrix to be transmitted, or before or after the respective matrixes constituting the n*(k*m) matrix to be transmitted. This may be predefined correspondingly by a user in the encoding means and the decoding means.

Next, the encoding means 1014 stores the encoded data of the formed encoded matrix (i.e., the elements of the matrix) in the encoded-data buffer 1016 in a transmission order in step S514. The detailed operations in step S504, S505 and S506 will be described in detail below with reference to FIG. 6.

Figure 6:
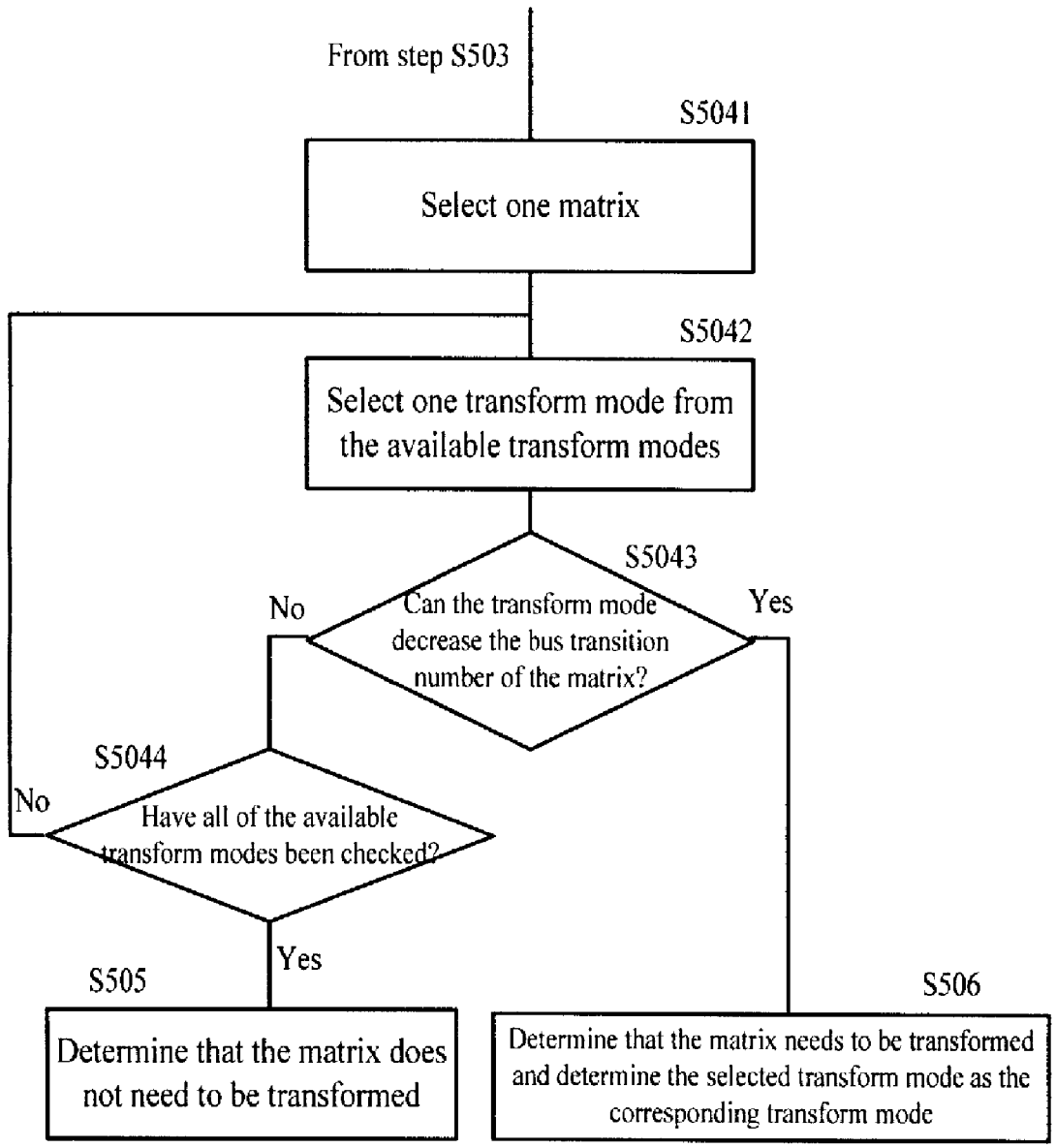
FIG. 6 is a flowchart showing detailed operations of steps S504, S505 and S506 shown in FIG. 5.

Referring to FIG. 6, in step S5041, the encoding means 1014 selects one of the (p*q) number of $L_i*C_j$ matrixes. Then, the encoding means 1014 selects one transform mode from the determined available matrix-transform modes in step S5042, and determines whether the transform mode can decrease the bus transition number of the matrix in step S5043. For example, the encoding means 1014 may transform the matrix by using the selected transform mode to obtain a transformed matrix, calculate the sum of the bus transition numbers of respective rows of the transformed matrix to obtain the bus transition number of the transformed matrix, and then compare the bus transition number of the transformed matrix with the bus transition number of the original matrix. If the bus transition number of the transformed matrix is more than or equal to the bus transition number of the original matrix, the selected transform mode can not decrease the bus transition number of the matrix; conversely, if the bus transition number of the transformed matrix is less than the bus transition number of the original matrix, the selected transform mode can decrease the bus transition number of the matrix. Furthermore, the encoding means 1014 may also adopt other methods that are well known in the art to make the above determination.

If it is determined in step S5043 that the selected transform mode can decrease the bus transition number, in step S506, the encoding means 1014 determines that the matrix needs to be transformed and determines the selected transform mode as the corresponding transform mode for transforming the matrix. On the other hand, when it is determined in step S5043 that the selected transform mode can not decrease the bus transition number, the encoding means 1014 goes to step S5044, where the encoding means 1014 determines whether all of the available transform modes have been checked. If it is determined in step S5044 that all of the available transform modes have been checked, the encoding means 1014 determines that the matrix does not need to be transformed in step S505. Conversely, if all of the available transform modes have not yet been checked, the encoding means 1014 returns to step S5042, selects another transform mode that is not checked, and repeats steps S5042 and S5043.

As described above, when it is determined in step S5043 that the selected transform mode can decrease the bus transition number, the encoding means 1014 determines the selected transform mode as the corresponding transform mode for transforming the matrix without continuing to check other available transform modes. Alternatively, when it is determined in step S5043 that the selected transform mode can decrease the bus transition number, the encoding means 1014 records a quantity by which the transform mode decreases the bus transition number, and continues to check whether there are other transform modes capable of decreasing the bus transition number of the matrix in the available transform modes, instead of stopping checking other available transform modes as described above, so as to find all transform modes capable of decreasing the bus transition number and determine corresponding quantities by which the bus transition number is decreased; then, the encoding means 1014 selects one transform mode which decreases the bus transition number most as the corresponding transform mode for transforming the matrix.

It is to be appreciated that although an order of performing the respective steps of the bus encoding method according to the embodiment of the invention is given above, the order of performing these steps can be changed appropriately without departing from the spirit and the scope of the embodiment. For example, the transform table may be read first to obtain the available transform modes, and then the data to be transmitted are read and organized into the (p*q) number of $L_i*C_j$ matrixes. Furthermore, above, it is determined, for all of the (p*q) number of $L_i*C_j$ matrixes, whether there are transform modes capable of decreasing their bus transition numbers first, and then the matrixes which need to be transformed are transformed by using the determined corresponding transform modes, respectively. However, it is also possible to transform each of the $L_i*C_j$ matrixes by using a transform mode immediately when it is determined that the transform mode is capable of decreasing their bus transition number.

After completing the above bus encoding, the transmitter 100 transmits the encoded data stored in the encoded-data buffer 1016 via the I/O circuit 102 and the bus 50 to the receiver 200 in a form of bursts. As described above, the I/O circuit may be rendered to transmit additionally one word (when one transform information word is generated) or a plurality of words (when a plurality of transform information words of the same number are generated) when the transform information word(s) is attached, so as to transmit the encoded data completely to the receiver 200. Likewise, as described above, in the bus encoding method according to the embodiment of the invention, besides transmitting the obtained encoded data after the encoding of all of the data of the k bursts is completed, it is also possible to transmit previously encoded data concurrently with encoding current data so as to reduce the time delay caused by encoding the data of the bursts.

Figure 7:
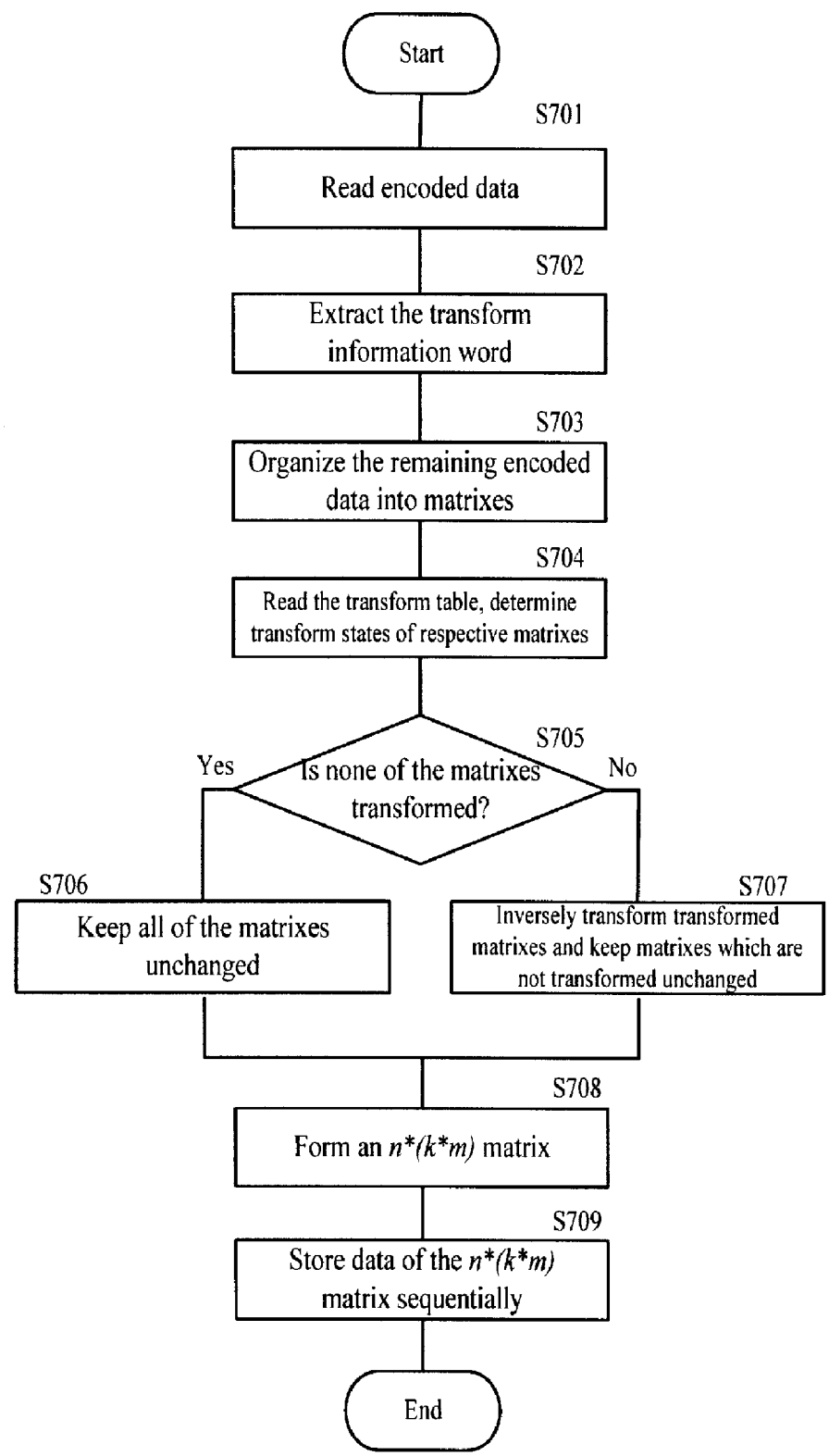
FIG. 7 is a flowchart showing a bus decoding method according to an embodiment of the present invention.

Below, a bus decoding method according to an embodiment of the invention will be described with reference to FIG. 7. FIG. 7 is a flowchart showing a bus decoding method according to an embodiment of the invention.

As described above, the same matrix organizing information, the same transform-information-word position information, and the same transform table as those in the transmitter 100 have been predefined in receiver 200 before data are received. Their detailed description is omitted for simplicity. The receiver 200 receives the encoded data transmitted from the transmitter 100, and stores the received encoded data in the encoded-data buffer 2022 sequentially.

Referring to FIG. 7, in step S701, the decoding means 2024 reads the received encoded data from the encoded-data buffer 2022. In step S702, the decoding means 2024 reads the transform-information-word position information from the original-data buffer 2026, and then extracts, according to the position of the transform information word predefined in the position information, the transform information word from the position in the read encoded data.

Next, in step S703, the decoding means 2024 reads the matrix organizing information from the original-data buffer 2026, and organizes the remaining encoded data after the transform information word is extracted into (p*q) number of $L_i*C_j$ matrixes in the above-mentioned matrix organizing manner based on the number of matrixes (i.e., p*q) and sizes of the respective matrixes predefined in the matrix organizing information, where i=1, . . . , p, j=1, . . . , q, and $$\sum_{i=1}^{p} L_i = n, \sum_{j=1}^{q} C_j = k*m.$$

Since the matrix organizing information stored in the original-data buffer 2026 is the same as that stored in the original-data buffer 1012, and the encoding means 1014 and the decoding means 2024 adopt the same matrix organizing manner, the (p*q) number of $L_i*C_j$ matrixes organized by the decoding means 2024 are the same as the (p*q) number of $L_i*C_j$ matrixes which are obtained by the encoding means 1014 and form the n*(k*m) matrix to be transmitted.

Subsequently, in step S704, the decoding means 2024 reads the transform table from the original-data buffer 2026, and compares one or more bits for indicating the transform state of each of the (p*q) number of $L_i*C_j$ matrixes in the extracted transform information word with a bit combination(s) predefined in the transform table, so as to determine the transform states of the respective matrixes. As described above, the decoding means 2024 can know the one or more bits for indicating the transform states of the respective matrixes in the transform information word by means of a predefinition made by a user or an automatic allocation based on an allocating rule.

Next, in step S705, the decoding means 2024 determines whether none of the (p*q) number of $L_i*C_j$ matrixes is transformed. If it is determined in step S705 that none of the (p*q) number of $L_i*C_j$ matrixes is transformed, the decoding means 2024 keeps the (p*q) number of $L_i*C_j$ matrixes unchanged in step S706 without performing any processing on them. On the other hand, if it is determined in step S705 that there are matrixes which have been transformed in the (p*q) number of $L_i*C_j$ matrixes, in step S707, the decoding means 2024 performs corresponding inverse transforms on the transformed matrixes respectively according to indications of bit combinations in the transform information word so as to obtain their original matrixes, and replaces the transformed matrixes with the inversely-transformed matrixes (i.e., their original matrixes); meanwhile, the decoding means 2024 keeps the matrixes which are determined to be not transformed in the (p*q) number of $L_i*C_j$ matrixes (if any) unchanged.

Then, in step S708, the decoding means 2024 forms the matrixes which are determined to be not transformed (if any) and the replaced matrixes into an n*(k*m) matrix, i.e., the original data matrix. Finally, in step S709, the decoding means 2024 sequentially stores data of the n*(k*m) matrix in the original-data buffer 2026 as original data for use by other means.

The respective steps of the bus encoding method and the bus decoding method according to the embodiment of the invention have been described above. However, it is to be appreciated that these steps are not all required, and some of the steps can be selectively omitted for different systems (transmitters and receivers). For example, when data to be transmitted are organized into one matrix, steps S507 and S508 of the encoding method shown in FIG. 5 and step S705 of the decoding method shown in FIG. 7 may be omitted and the remaining steps may be adjusted adaptively; and when there is only one determined available transform mode, step S5044 shown in FIG. 6 may be omitted and the remaining steps may be adjusted adaptively. Those skilled in the art can understand that these changes are all included in the scope of the embodiment.

The bus encoding method and the bus decoding method according to the embodiment of the invention will be described below in conjunction with several examples.

Figure 8:
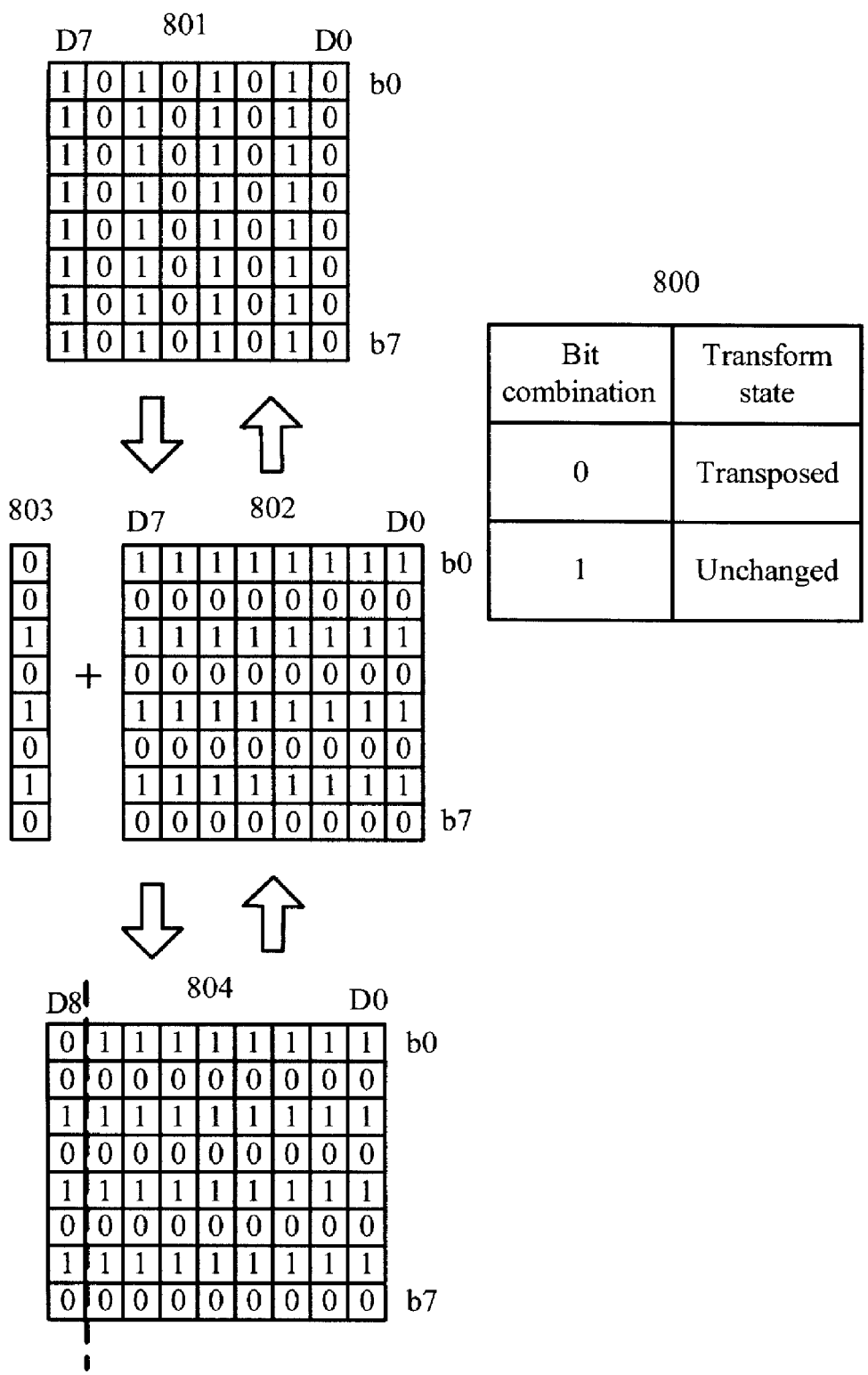
FIG. 8 shows a first example exemplifying the bus encoding method and the bus decoding method according to the embodiment of the present invention.

FIG. 8 shows a first example exemplifying the bus encoding method and the bus decoding method according to the embodiment of the invention. In FIG. 8, a downward arrow represents an encoding process, and an upward arrow represents a decoding process.

In the example shown in FIG. 8, the width of the parallel bus n is 8, and the burst length m is 8. As described above, a length of a word is defined here to be equal to the width of the parallel bus. The number of bursts k and the number of matrixes (p*q) predefined in matrix organizing information are both 1; the predefined transform table is a transform table 800; the position of the transform information word predefined in transform-information-word position information is the end of encoded data; and the least significant bit (LSB) of the transform information word is used to indicate the transform state of the matrix. All of the above information is predefined in the encoding means 1014 and the decoding means 2024.

First, the encoding means 1014 reads the matrix organizing information from the original-data buffer 1012, determines that the predefined number of bursts k is 1, and reads one burst from the original-data buffer 1012, totaling 64 bits. Then, the encoding means 1014 organizes data words in one burst into one 8*8 matrix 801 in the above-mentioned matrix organizing method according to the matrix number of 1 predefined in the matrix organizing information. At this time, $L_1=8$ and $C_1=8$.

Next, the encoding means 1014 reads the predefined transform table 800 from the original-data buffer 1012, and determines that an available matrix transform mode predefined there is a transposition transform. Then, the encoding means 1014 checks whether the transposition transform can decrease the bus transition number of the 8*8 matrix 801. Since the transposition transform can decrease the bus transition number of the matrix 801 shown in FIG. 7, the encoding means 1014 determines that the matrix needs to be transformed, determines the transposition transform as the corresponding transform mode for transforming the matrix, and transforms the matrix by using the transposition transform to obtain a transformed matrix 802.

Then, the encoding means 1014 generates the transform information word 803 indicating whether the matrix is transformed and the matrix transform mode used when it is transformed according to the transform table 800. In particular, the encoding means 1014 generates a transform information word first. Since the matrix 801 is transposed, the encoding means 1014 sets, according to a bit combination "0" indicating the transposition transform in the transform table, the least significant bit of the transform information word to 0 so as to show that the matrix has been transposed or the corresponding matrix received by the receiver is a result of transposing its original matrix. Then, the encoding means sets the remaining bits of the transform information word to be the same as corresponding bits (bits sequentially transmitted on the same transmission lines as the remaining bits) of a word (D7) next to the transform information word, thereby obtaining the transform information word 803, "01010100". As described above, the remaining bits are so set that the bus transition number increased due to the attachment of the transform information word can be decreased as much as possible. Next, the encoding means 1014 attaches the transform information word as an additional column to the matrix 802 according to the transform-information-word position information, thereby forming an 8*9 encoded data matrix 804. Finally, the encoding means 1014 stores the encoded data of the encoded data matrix 804 sequentially in the encoded-data buffer 1016 in the order in which they were read previously.

When receiving the above-mentioned encoded data transmitted by the transmitter 100, the receiver 200 stores the encoded data in the encoded-data buffer 2022. The decoding process of this example will be described below.

The decoding means 2024 reads the received 72 (=8*9) encoded data from the encoded-data buffer 2022. Then, the decoding means 2024 reads the transform-information-word position information from the original-data buffer 2026, determines that the transform information word is attached to the encoded data, and thus extracts the last 8 bits of data as the transform information word 803, i.e., "01010100". Next, the decoding means 2024 reads the matrix organizing information from the original-data buffer 2026, and organizes the remaining 64 data bits into an 8*8 matrix, i.e., the matrix 802, in the above-mentioned matrix organizing manner based on the matrix number of 1 predefined in the matrix organizing information.

Subsequently, the decoding means 2024 reads the transform table 800, and compares the least significant bit "0" of the transform information word with bit combinations in the transform table to determine the transform state of the matrix. Since "0" is predefined to represent the transposition transform in the transform table, the decoding means 2024 determines that the matrix is a result of performing the transposition transform on its original matrix, and thus transposes it again to obtain its original matrix 801. Finally, the decoding means 2024 stores the data of the original matrix 801 sequentially into the original-data buffer 2026 for use by other means. Note that the replacing and forming operations can be omitted in the encoding and decoding process, since there is only one matrix in the example.

In the present example, the bus transition number of the original data (i.e., the data matrix 801) is 7*8=56, whereas the bus transition number of the encoded data (i.e., the data matrix 804) is 1. Therefore, the bus transition number in the I/O circuit is decreased significantly and thereby the I/O power is reduced significantly. In the present example, only the transposition transform is used to transform the matrix composed of the original data. This transform mode can be used when the encoder organizes the data to be transmitted into a square matrix. Statistically, when only the transposition transform is used as the available transform mode in the transform table, the bus transition number may be decreased by 19 percent on average for various randomly generated patterns of data. Therefore, the transposition transform has a beneficial effect for the case where data are organized into a square matrix.

Figure 9:
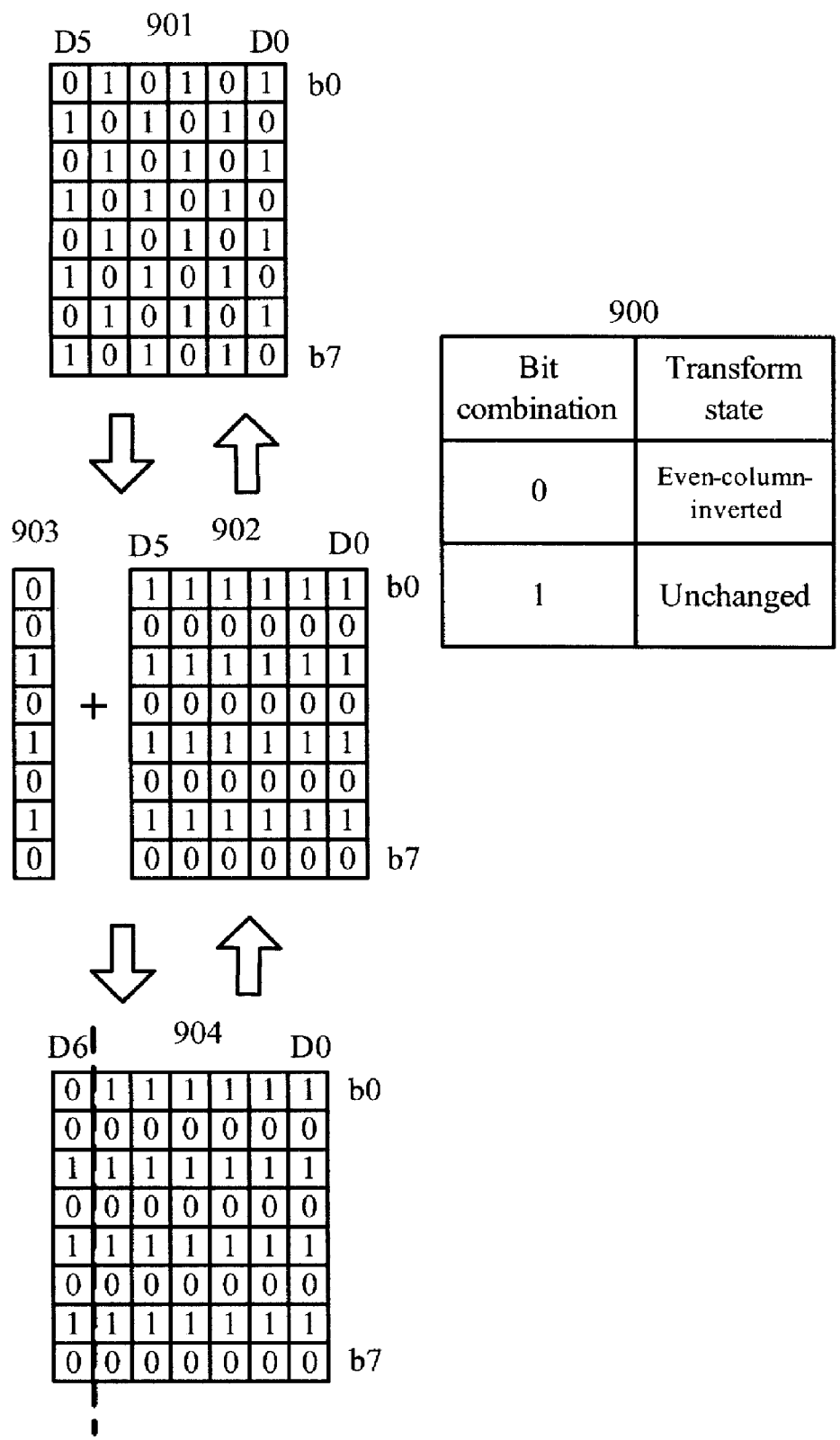
FIG. 9 shows a second example exemplifying the bus encoding method and the bus decoding method according to the embodiment of the present invention.

FIG. 9 shows a second example exemplifying the bus encoding method and the bus decoding method according to the embodiment of the invention. In FIG. 9, a downward arrow represents an encoding process, and an upward arrow represents a decoding process. In this example, the width of the parallel bus n is 8, the burst length m is 6, the predefined number of bursts k and the predefined number of matrixes (p*q) are both 1, a predefined position of the transform information word is the end of encoded data, and the least significant bit of the transform information word is used to indicate the transform state of the matrix. In addition, the predefined transform table is the transform table 900, and the available transform mode is an even-column-inverting transform. The encoding process and the decoding process of the example shown in FIG. 9 are similar to those of the example shown in FIG. 8, and thus the detailed description is omitted and only results of respective stages are shown in FIG. 9. It can be shown by comparing the original matrix 901 with the encoded data matrix 904 that the bus encoding method according to the embodiment of the present invention decreases the bus transition number of the data from 40 to 1. The even-column-inverting transform used in the present example is applicable for matrixes of any size. Furthermore, in the present example, besides transmitting the encoded data after all data of the matrix 901 have been processed, data of a previously processed column may be transmitted while data of a current column are being processed. For example, data of the first column may be transmitted to the receiver while data of the second column is being even-column-inverted, instead of transmitting seven columns of data after having processed all six columns of data and attached the transforming information word. As a result, the time delay cause by processing the data can be reduced.

In the first and second examples, the original data are organized into one matrix. An example of organizing the original data into a plurality of matrixes is given below.

Figure 10:
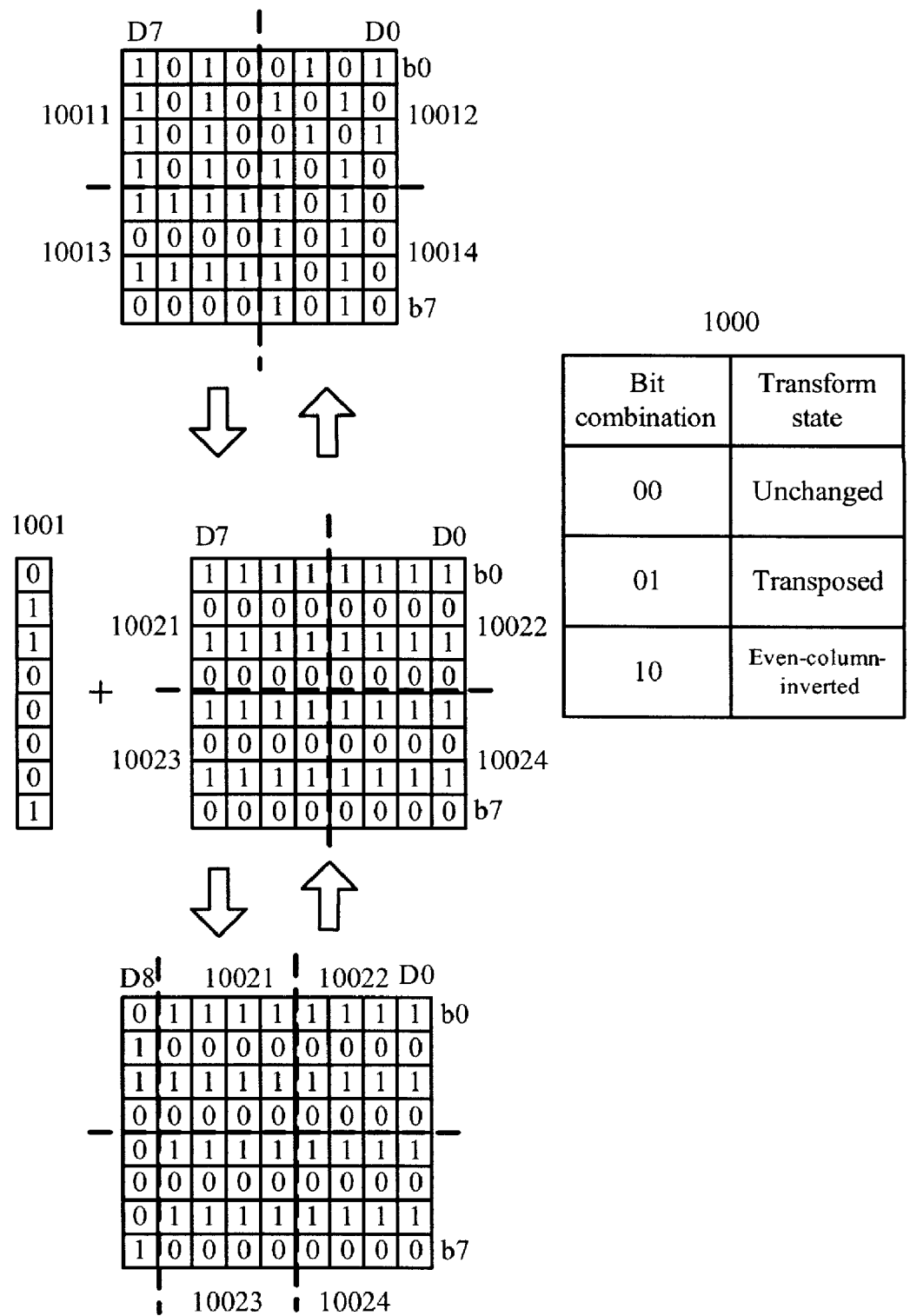
FIG. 10 shows a third example exemplifying the bus encoding method and the bus decoding method according to the embodiment of the present invention.

FIG. 10 shows a third example exemplifying the bus encoding method and the bus decoding method according to the embodiment of the present invention. In FIG. 10, a downward arrow represents an encoding process, and an upward arrow represents a decoding process.

In the example of FIG. 10, the width of the parallel bus n is 8, and the burst length m is 8. The number of bursts k predefined in the matrix organizing information is 1, the number of the organized matrixes (p*q) is 2*2=4 and the size of each of the matrixes is 4*4; the predefined transform table is a transform table 1000, the position of the transform information word predefined in the transform-information-word position information is the end of encoded data, and 8 bits of the transform information word are predefined to be respectively used for 4 organized matrixes in a unit of two bits from the least significant bit to the most significant bit. The encoding process of this example will be described below.

First, the encoding means 1014 reads the matrix organizing information from the original-data buffer 1012, and reads one burst, totally 64 bits, according to the number of the bursts k=1 predefined. Then, according to the number of matrixes 4 and the sizes of the respective matrixes predefined in the matrix organizing information, the encoding means 1014 organizes data of the burst into four 4*4 matrixes 10011, 10012, 10013 and 10014 in the above-mentioned matrix organizing method, as shown in the upper portion of FIG. 10. At this time, $L_i$ and $C_j$ (i=1, 2; j=1, 2) are both equal to 4.

Subsequently, the encoding means 1014 reads the predefined transform table from the original-data buffer 1012, and determines that the available transform modes are a transposition transform and an even-column-inverting transform.

Next, the encoding means 1014 selects each of the four matrixes sequentially, and checks whether there is a transform mode capable of decreasing the bus transition number of the matrix in the available transform modes. Specifically, the encoding means 1014 selects the matrix 10011, and determines whether the transposition transform can decrease the bus transition number of the matrix.

Since the transposition transform can decrease the bus transition number of the matrix 10011, the encoding means 1014 determines that the matrix 10011 needs to be transformed, and determines the transposition transform as the corresponding transform mode for transforming the matrix. Then, the encoding means 1014 selects the matrix 10012, and determines that the even-column-inverting transform needs to be performed on it as a result of the above-mentioned check. Next, the encoding means 1014 selects the matrix 10013, and determines whether the transposition transform can decrease its bus transition number. After getting a negative answer, the encoding means 1014 determines whether the even-column-inverting transform can decrease its bus transition number, and still gets a negative answer. Since the transform table predefines only two available transforms, the encoding means 1014 determines that the matrix 10013 does not need to be transformed. Then, the encoding means 1014 determines that the transposition transform needs to be performed on the matrix 10014 in a similar way.

Next, the encoding means 1014 performs the transposition transform on the matrixes 10011 and 10014 to obtain transformed matrixes 10021 and 10024, performs the even-column-inverting transform on the matrix 10012 to obtain a transformed matrix 10022, and keeps the matrix 10013 unchanged and uses it directly as matrix 10023, so that the original matrixes 10011, 10012 and 10014 are replaced with the transformed matrixes 10021, 10022 and 10024. Then the encoding means 1014 forms the transformed matrixes 10021, 10022, and 10024 and the matrix 10023 into an 8*8 matrix to be transmitted, as shown in middle portion of FIG. 10.

Then, the encoding means 1014 generates a transform information word 1001 indicating the transform states of the four matrixes according to the transform table 1000. In particular, the encoding means 1014 generates a transform information word first. After this, the encoding means 1014 sets corresponding bits of the transform information word according to the transform states of the respective matrixes and the transform table. Since in the transform table 1000, "00" represents that a matrix is not changed, "01" represents that a matrix is transposed, and "10" represents that even columns of a matrix are inverted, the transform information word 1001 is set as "10000110" from the most significant bit to the least significant bit.

Next, the encoding means 1014 reads the transform-information-word position information, and attaches the transform information word 1001 as an additional column after the 8*8 matrix to be transmitted according to the information, thereby forming an 8*9 encoded data matrix actually to be transmitted, as shown in the lower portion of FIG. 10. Finally, the encoding means 1014 stores the encoded data of the encoded data matrix into the encoded-data buffer 1016 sequentially.

The transmitter 100 transmits the encoded data to the receiver 200 via the I/O circuit 102 and the bus 50. The receiver 200 receives the encoded data via the I/O circuit 201, and stores them in the encoded-data buffer 2022 sequentially. The decoding process of the example is described below.

First, the decoding means 2024 reads the encoded data, totally 72 bits. Then, the decoding means 2024 reads the transform-information-word position information from the original-data buffer 2026, determines that the transform information word is attached at the end of the encoded data, and extracts the last 8 bits of data, i.e., "10000110", as the transform information word 1001.

Next, the decoding means 2024 reads the matrix organizing information from the original-data buffer 2026, and organizes the remaining 64 bits into four 4*4 matrixes in the same matrix organizing manner as the encoding means 1014, based on the number of matrixes "4" and the size of each of the matrixes predefined in the matrix organizing information. Obviously, the four organized matrixes are the matrixes 10021-10024.

Subsequently, the decoding means 2024 reads the transform table 1000 from the original-data buffer 2026, and compares bits indicating the transform states of the 4 matrixes in the transform information word with bit combinations in the transform table 1000 sequentially to determine the transform states of the respective matrixes. In the present example, the decoding means 2024 determines that the transposition transform has been performed on the matrixes 10021 and 10024, the even-column-inverting transform has been performed on the matrix 10022, and no transform is performed on the matrix 10023.

Next, the decoding means 2024 performs the transposition transform on the matrixes 10021 and 10024 and performs the even-column-inverting transform on the matrix 10022 to thereby replace the matrixes 10021, 10022 and 10024 with their original matrixes 10011, 10012 and 10014, and keeps the matrix 10023 unchanged and uses it directly as the matrix 10013. Then, the decoding means 2024 forms the original matrixes 10011-10014 into one 8*8 original matrix, and stores data of the original matrix into the original-data buffer 2026 sequentially for use by other means.

In the present example, the bus transition number of the original data is 51, and the bus transition number of data which are actually transmitted is 5, thus the bus transition number is decreased significantly. This method can be applied to any system with the bus width being n, the burst length being m, and n being a multiple of m.

In the above examples, data of 1 burst are organized into one or more matrixes, and the transform information word is defined to indicate transform states of the respective matrixes. However, data of a plurality of bursts may also be organized into one or more matrixes, and/or different definitions may be given to the transform information word.

Figure 11:
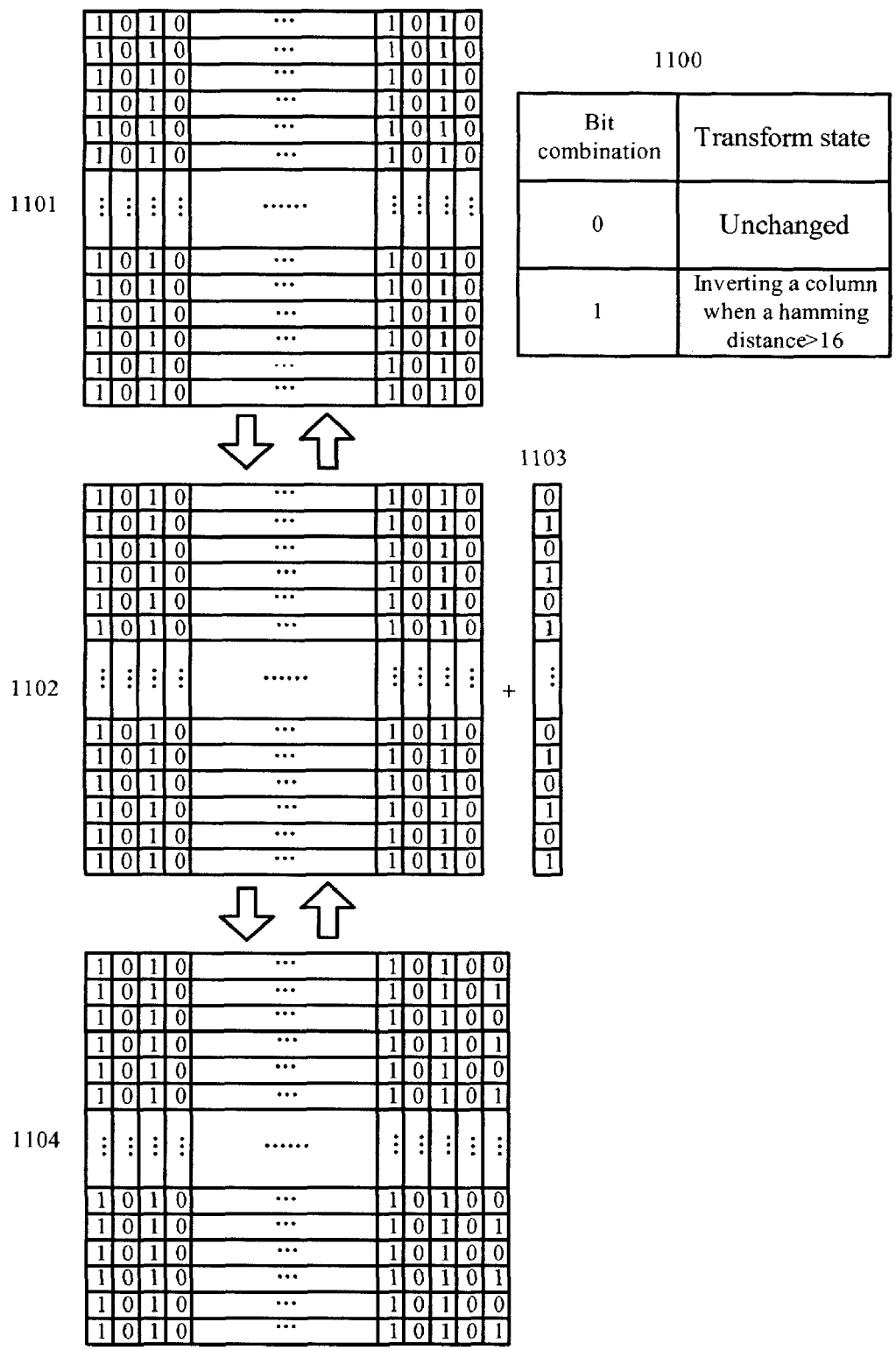
FIG. 11 shows a fourth example exemplifying the bus encoding method and the bus decoding method according to the embodiment of the present invention.

FIG. 11 shows a fourth example exemplifying the bus encoding method and the bus decoding method according to the embodiment of the present invention. In this example, data of 4 bursts are organized into one matrix.

In this example, the width of the parallel bus n is 32, and the burst length m is 8. The number of bursts k predefined in the matrix organizing information is 4, the number of the organized matrixes p*q is 1, and the transform information word is predefined to indicate transform states of respective columns of the organized matrix, instead of transform state of the organized matrix as described above. Furthermore, the predefined transform table is the transform table 1100, and the transform mode predefined is that if a hamming distance (the number of positions for which the corresponding symbols are different) between the current column (a word to be transmitted currently) and a previous column (a word transmitted previously) is larger than a half of the bus width (16=32/2), the current column is inverted.

The encoding means 1014 reads the matrix organizing information from the original-data buffer 1012, determines that the number of bursts k predefined is 4, and reads 4 bursts from the original-data buffer 1012. Subsequently, the encoding means 1014 organizes the 4 bursts into a 32*32 matrix 1101 in the above-mentioned matrix organizing manner according to the predefined number of matrixes 1. Next, the encoding means 1014 transforms the matrix 1101 to generate a transformed matrix 1102, generates a transform information word 1103 each bit of which represents a transform state of one corresponding column of the matrix 1102, and attaches the transform information word 1103 before the transformed matrix 1102 to generate an encoded data matrix 1104. Since the above encoding process and a subsequent decoding process are similar to those of the examples described above, a detailed description is omitted for simplicity.

In the present example, the bus transition number of the original data is 992, and the bus transition number of the data which are actually transmitted is 16, thus the bus transition number is decreased significantly. This method can be applied to any system with a bus width being n, a burst length being m, and n being a multiple of m.

As described above, the bus encoder and the bus encoding method according to the embodiment of the present invention are not only applicable for a data bus, but also applicable for an address bus. They reduce significantly the bus transition number of data actually transmitted by selectively transforming the data before transmitting the data to the I/O circuit and the bus, thereby decreasing the I/O power and the power of the whole system and making the processor power and the I/O power more balanced.

Furthermore, as compared with the case of defining only one available transform mode, more choices can be provided to transform the data by defining a plurality of available transform modes in the transform table, so as to achieve a better effect. Moreover, in this case, by organizing the data into a plurality of matrixes, a different transform may be applied to each of the matrix, and the applied transform may be one decreasing the bus transition number of the matrix most, so that a better effect than that of the case of organizing the data into only one matrix is achieved.

Above, the transform table, the matrix organizing information, the transform-information-word position information and other information are predefined in the transmitter and the receiver, which may be implemented by defining a common protocol between the transmitter and the receiver and predefining the information in the protocol.

Furthermore, in the present embodiment, a requirement for an additional signal line is eliminated by attaching the transform information word onto the data to be transmitted. However, this is not restrictive; in some cases, for example, in a case where there is no need to take compatibility into account, the additional signal line may also be used to transmit the transform information word separately, instead of attaching it to the data to be transmitted.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method of encoding data transmitted in a manner of bursts via a parallel bus, wherein a width of the parallel bus is n bits and each of the bursts includes m data words wherein m and n are natural numbers, the method comprising:

an organizing step for organizing data of the k bursts into (p*q) number of $L_i*C_j$ matrixes, wherein k, p, q, i, j, $L_i$ and $C_j$ are natural numbers, i=1, ..., p, j=1, ..., q, and $$\sum_{i=1}^{p} L_i = n, \sum_{j=1}^{q} C_j = k*m;$$

a determining step having the steps of:
  determining for each of the $L_i*C_j$ matrixes, whether a transform mode capable of decreasing a bus transition number of the matrix exists,
  determining that the matrix needs to be transformed, and
  determining a corresponding transform mode for transforming the matrix when the transform mode capable of decreasing the bus transition number of the matrix exists;
a transforming step having the steps of:
  transforming the matrix which is determined to need to be transformed by using the determined corresponding transform mode for transforming the matrix, and
  replacing the matrix which is determined to need to be transformed with the transformed matrix;
a forming step for forming a matrix which is determined to not need to be transformed and the replaced matrix into an n*(k*m) matrix to be transmitted;
a generating step for generating an n-bit transform information word indicating transform states of the (p*q) number of $L_i*C_j$ matrixes; and
an attaching step for attaching the transform information word to the n*(k*m) matrix to be transmitted to form an encoded matrix to be actually transmitted.

2. The method of claim 1, wherein a column of the n*(k*m) matrix formed by the (p*q) number of $L_i*C_j$ matrixes comprises (k*m) data words in the k bursts, and a row of the n*(k*m) matrix comprises bits transmitted sequentially via a same transmission line of the parallel bus in the (k*m) data words.

3. The method of claim 1, wherein for each of the $L_i*C_j$ matrixes, the determining step further comprises the steps of:
  selecting one transform mode from one or more predetermined transform modes;
  checking whether the transform mode can decrease the bus transition number of the matrix;
  determining that the matrix needs to be transformed when the transform mode can decrease the bus transition number of the matrix;
  determining the transform mode as the corresponding transform mode for transforming the matrix;
  selecting another transform mode from the one or more predetermined transform modes when the transform mode cannot decrease the bus transition number of the matrix;
  repeating the checking step for the another transform mode; and
  selecting one of the steps of: (i) finding a transform mode capable of decreasing the bus transition number of the matrix; and (ii) determining that none of the transform modes can decrease the bus transition number of the matrix to thereby determine that the matrix does not need to be transformed.

4. The method of claim 3, wherein the one or more predetermined transform modes comprise a transposition transform or an even-column-inverting transform.

5. The method of claim 3, wherein the one or more predetermined transform modes are predefined in a transform table, wherein bit combinations indicating the transform states of the matrixes are predefined in the transform table, and wherein in the generating step, according to the transform state of each of the $L_i*C_j$ matrixes, bits corresponding to the matrix in the transform information word are set to one of the bit combinations which corresponds to the transform state predefined in the transform table.

6. The method of claim 5, wherein the generating step further comprises the step of:

setting bits which are not used to indicate the transform states in the transform information word to be the same as corresponding bits of columns neighboring the transform information word in the n*(k*m) matrix to be transmitted.

7. The method of claim 1, wherein for each of the $L_i*C_j$ matrixes, the determining step further comprises the steps of:

checking whether each of one or more predetermined transform modes can decrease the bus transition number of the matrix;

recording a decreased quantity of the bus transition number of the matrix generated by the transform mode when the transform mode can decrease the bus transition number; and selecting one of the steps of: (i) selecting a transform mode which generates the largest decreased quantity among transform modes capable of decreasing the bus transition number of the matrix as the corresponding transform mode for transforming the matrix if the transform modes exist; and (ii) determining that the matrix does not need to be transformed.

8. The method of claim 1, wherein the transform information word is attached before or after the n*(k*m) matrix to be transmitted, according to predefined transform-information-word position information.

9. An encoder for encoding data transmitted in a manner of bursts via a parallel bus, wherein a width of the parallel bus is n bits and each of the bursts includes m data words with m and n being natural numbers, the encoder comprising:

an organizing unit for organizing data of the k bursts into (p*q) number of $L_i*C_j$ matrixes, where k, p, q, i, j, $L_i$ and $C_j$ are natural numbers, i=1, . . . , p, j=1, . . . , q, and $$\sum_{i=1}^{p} L_i = n, \sum_{j=1}^{q} C_j = k*m;$$

a determining unit for:
determining, for each of the $L_i*C_j$ matrixes, whether a transform mode capable of decreasing a bus transition number of the matrix exists,
determining that the matrix needs to be transformed, and determining a corresponding transform mode for transforming the matrix when the transform mode capable of decreasing the bus transition number of the matrix exists;

a transforming unit for:
transforming the matrix which is determined to need to be transformed by using the determined corresponding transform mode for transforming the matrix, and replacing the matrix which is determined to need to be transformed with the transformed matrix;

a forming unit for forming a matrix which is determined to not need to be transformed and the replaced matrix into an n*(k*m) matrix to be transmitted;

a generating unit for generating an n-bit transform information word indicating transform states of the (p*q) number of $L_i*C_j$ matrixes; and an attaching unit for attaching the transform information word to the n*(k*m) matrix to be transmitted to form an encoded matrix to be actually transmitted.

10. The encoder of claim 9, wherein a column of the n*(k*m) matrix formed by the (p*q) number of $L_i*C_j$ matrixes comprises (k*m) data words in the k bursts, and a row of the n*(k*m) matrix comprises bits transmitted sequentially via a same transmission line of the parallel bus in the (k*m) data words.

11. The encoder of claim 9, wherein when determining for each of the $L_i*C_j$ matrixes whether the transform mode capable of decreasing the bus transition number of the matrix exists, the determining unit:

selects one transform mode from one or more predetermined transform modes;

checks whether the transform mode can decrease the bus transition number of the matrix;

determines that the matrix needs to be transformed when the transform mode can decrease the bus transition number of the matrix;

determines the transform mode as the corresponding transform mode for transforming the matrix;

selects another transform mode from the one or more predetermined transform modes when the transform mode cannot decrease the bus transition number of the matrix;

repeats the checking step for the another transform mode; and either finds a transform mode capable of decreasing the bus transition number of the matrix or determines that none of the transform modes can decrease the bus transition number of the matrix to thereby determine that the matrix does not need to be transformed.

12. The encoder of claim 11, wherein the one or more predetermined transform modes comprise a transposition transform or an even-column-inverting transform.

13. The encoder of claim 11, further comprising:

a storing unit for storing a transform table where the one or more predetermined transform modes and bit combinations indicate that the transform states of the matrixes are predefined, and wherein the generating unit sets, according to the transform state of each of the $L_i*C_j$ matrixes, bits corresponding to the matrix in the transform information word to a bit combinations of the n-bit transform information word which corresponds to the transform state predefined in the transform table.

14. The encoder of claim 13, wherein the generating unit further sets bits which are not used to indicate the transform states in the transform information word to be the same as corresponding bits of columns neighboring the transform information word in the n*(k*m) matrix to be transmitted.

15. The encoder of claim 9, wherein when determining, for each of the $L_i*C_j$ matrixes, whether the transform mode capable of decreasing the bus transition number of the matrix exists, the determining unit further:

checks whether each of one or more predetermined transform modes can decrease the bus transition number of the matrix sequentially, records a decreased quantity of the bus transition number of the matrix generated by the transform mode when the transform mode can decrease the bus transition number; and selects a transform mode which generates the largest decreased quantity among transform modes capable of decreasing the bus transition number of the matrix as the corresponding transform mode for transforming the matrix if the transform modes exist, or determines that the matrix does not need to be transformed.

16. The encoder of claim 9, wherein the attaching unit attaches the transform information word before or after the n*(k*m) matrix to be transmitted, according to predefined transform-information-word position information.

17. A method for decoding encoded data transmitted via a parallel bus, wherein a width of the parallel bus is n bits, wherein the encoded data includes an n-bit transform information word and data of k bursts, and each of the bursts includes m data words, wherein k, m and n are natural numbers, the method comprising the steps of:

extracting the transform information word from the encoded data according to predefined transform-information-word position information;

organizing the remaining data of the encoded data into (p*q) number of $L_i * C_j$ matrixes according to a predefined number of matrixes and predefined sizes of the respective matrixes, where p, q, i, j, $L_i$ and $C_j$ are natural numbers, i=1, ..., p, j=1, ..., q, and $$\sum_{i=1}^{p} L_i = n, \sum_{j=1}^{q} C_j = k*m;$$

determining transform states of each of the $L_i * C_j$ matrixes according to the transform information word;

performing a corresponding inverse transform on a transformed matrix in the (p*q) number of $L_i * C_j$ matrixes;

replacing the transformed matrix with the inversely-transformed matrix;

keeping a matrix which is determined to be not transformed unchanged, according to the determined transform states of each of the $L_i * C_j$ matrixes; and forming the matrix which is determined to be not transformed and the replaced matrix into an n*(k*m) matrix as an original data matrix.

18. A decoder for decoding encoded data transmitted via a parallel bus, wherein a width of the parallel bus is n bits, the encoded data include an n-bit transform information word and data of k bursts, and each of the bursts includes m data words, where k, m and n are natural numbers, the decoder comprising:

an extracting unit for extracting the transform information word from the encoded data according to predefined transform-information-word position information;

an organizing unit for organizing the remaining data of the encoded data into (p*q) number of $L_i * C_j$ matrixes according to a predefined number of matrixes and predefined sizes of the respective matrixes, where p, q, i, j, $L_i$ and $C_j$ are natural numbers, i=1, ..., p, j=1, ..., q, and $$\sum_{i=1}^{p} L_i = n, \sum_{j=1}^{q} C_j = k*m;$$

a determining unit for determining transform states of each of the $L_i * C_j$ matrixes according to the transform information word;

an inversely-transforming unit for performing a corresponding inverse transform on a transformed matrix in the (p*q) number of $L_i * C_j$ matrixes and replacing the transformed matrix with the inversely-transformed matrix, and keeping a matrix which is determined to be not transformed unchanged, according to the determined transform states of each of the $L_i * C_j$ matrixes; and a forming unit for forming the matrix which is determined to be not transformed and the replaced matrix into an n*(k*m) matrix as an original data matrix.

19. A computer readable article of manufacture tangibly embodying computer readable instructions for executing a computer implemented method of encoding data transmitted in a manner of bursts via a parallel bus, wherein a width of the parallel bus is n bits and each of the bursts includes m data words with m and n being natural numbers, the method comprising:

an organizing step for organizing data of the k bursts into (p*q) number of $L_i * C_j$ matrixes, wherein k, p, q, i, j, $L_i$ and $C_j$ are natural numbers, i=1, ..., p, j=1, ..., q, and $$\sum_{i=1}^{p} L_i = n, \sum_{j=1}^{q} C_j = k*m;$$

a determining step having the steps of:
  determining for each of the $L_i * C_j$ matrixes, whether a transform mode capable of decreasing a bus transition number of the matrix exists,
  determining that the matrix needs to be transformed, and determining a corresponding transform mode for transforming the matrix when the transform mode capable of decreasing the bus transition number of the matrix exists;

a transforming step having the steps of:
  transforming the matrix which is determined to need to be transformed by using the determined corresponding transform mode for transforming the matrix, and replacing the matrix which is determined to need to be transformed with the transformed matrix;

a forming step for forming a matrix which is determined to not need to be transformed and the replaced matrix into an n*(k*m) matrix to be transmitted;

a generating step for generating an n-bit transform information word indicating transform states of the (p*q) number of $L_i * C_j$ matrixes; and an attaching step for attaching the transform information word to the n*(k*m) matrix to be transmitted to form an encoded matrix to be actually transmitted.

* * * * *